United States Patent

[11] 3,555,252

| [72] | Inventor | Murray Garden |
| | | Oreland, Pa. |
| [21] | Appl. No. | 637,769 |
| [22] | Filed | May 11, 1967 |
| [45] | Patented | Jan. 12, 1971 |
| [73] | Assignee | Leeds & Northrup Company |
| | | Philadelphia, Pa. |
| | | a corporation of Pennsylvania |

[54] LEARNING CONTROL OF ACTUATORS IN CONTROL SYSTEMS
17 Claims, 12 Drawing Figs.

[52] U.S. Cl.............................................. 235/151.1,
235/150.1; 318/18; 340/172.5
[51] Int. Cl.............................................. G06f 15/18,
G05b 13/00
[50] Field of Search............................................. 235/151.11,
150.1, 150.5, 151.1; 340/172.5(.55); 318/18

[56] References Cited
UNITED STATES PATENTS

| 3,216,676 | 11/1965 | Brown et al. | 340/172.5 |
| 3,400,314 | 9/1968 | Wilson | 318/18 |
| 3,427,442 | 2/1969 | Sklaroff | 235/151.1 |
| 3,440,617 | 4/1969 | Lesti | 340/172.5 |

*Primary Examiner*—Eugene G. Botz
*Assistant Examiner*—Felix D. Gruber
*Attorney*—Woodcock, Washburn, Kurtz & Mackiewicz

ABSTRACT: A learning control technique which learns the characteristics of actuators, such as electric drive units, and provides actuator signals based on them. The command signal, which is related to the actuator characteristic, and from which the actuator signal is derived, is stored in the computer memory and is modified by an amount related to a function of the error between the actual movement and the desired movement of the actuator. A specific application of learning control to both electric drive units and pneumatic actuators is described.

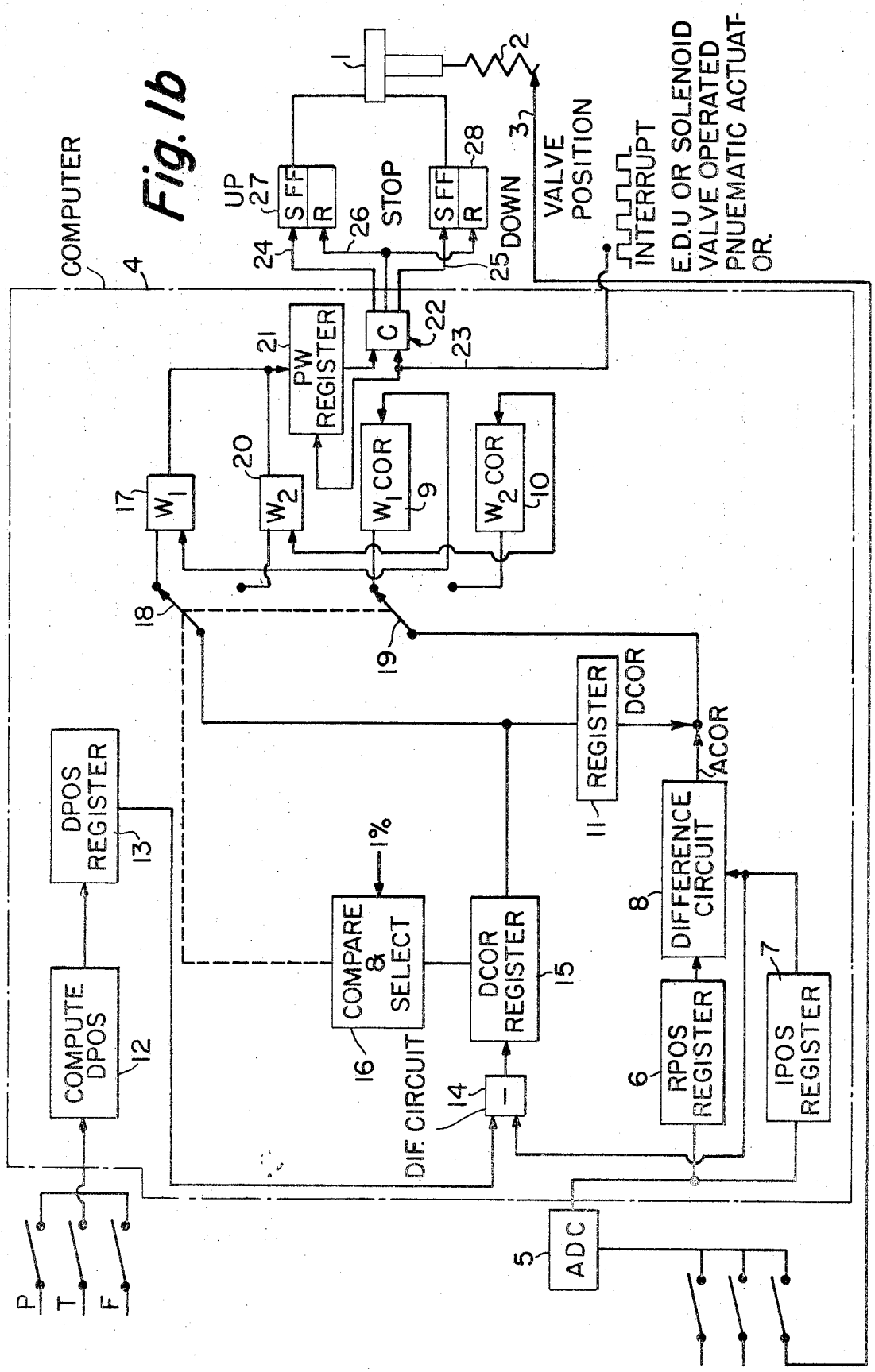

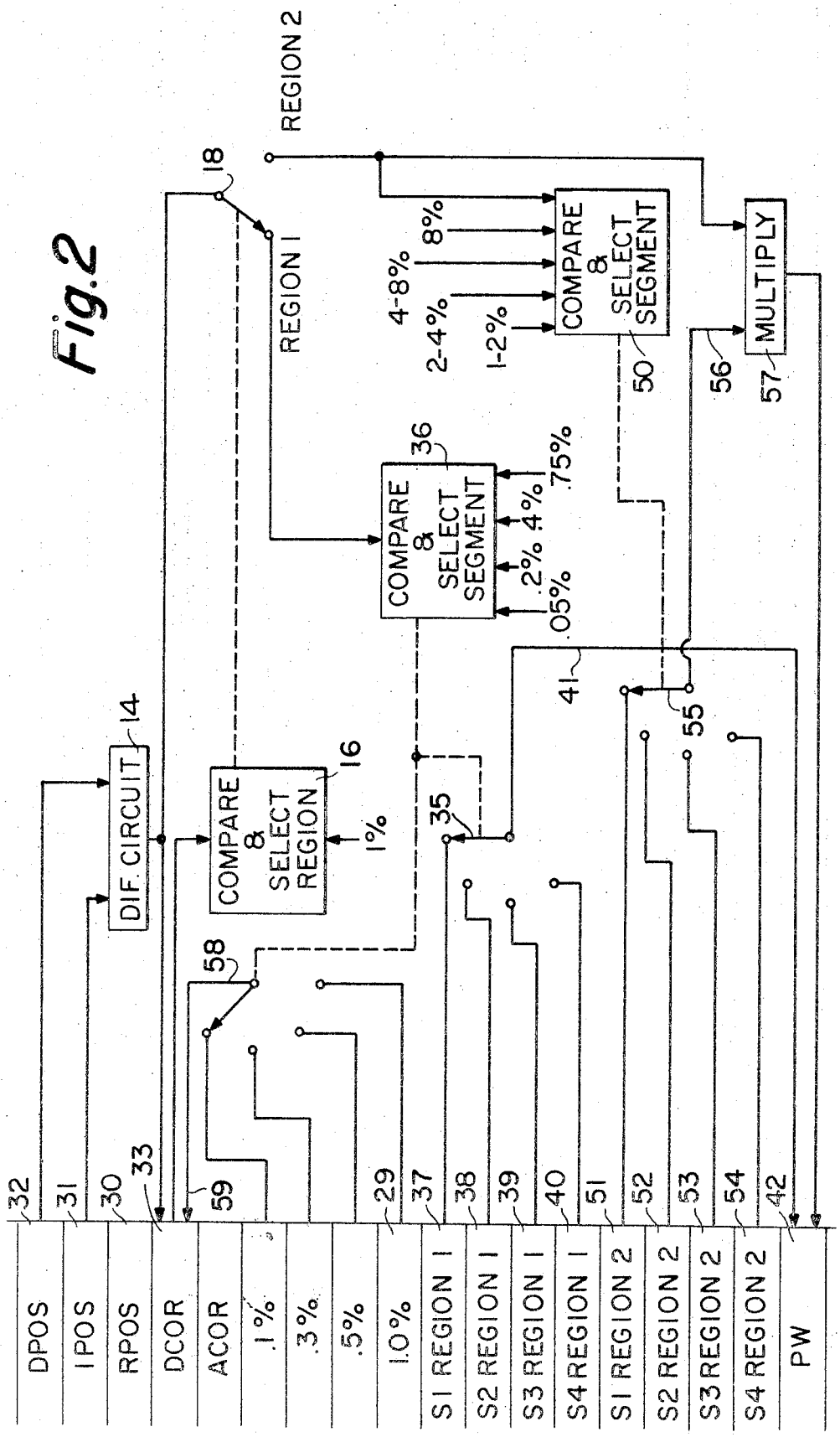

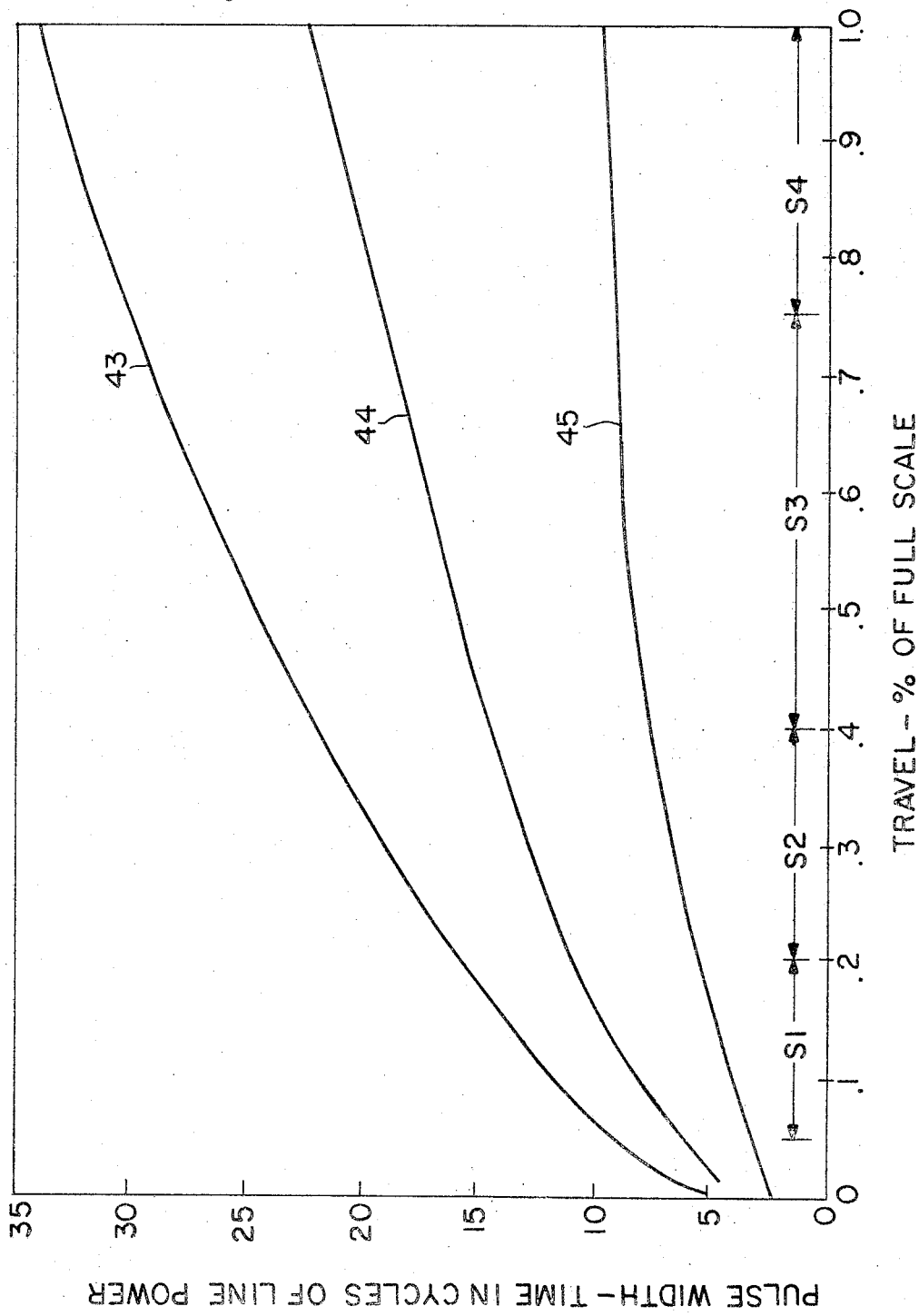

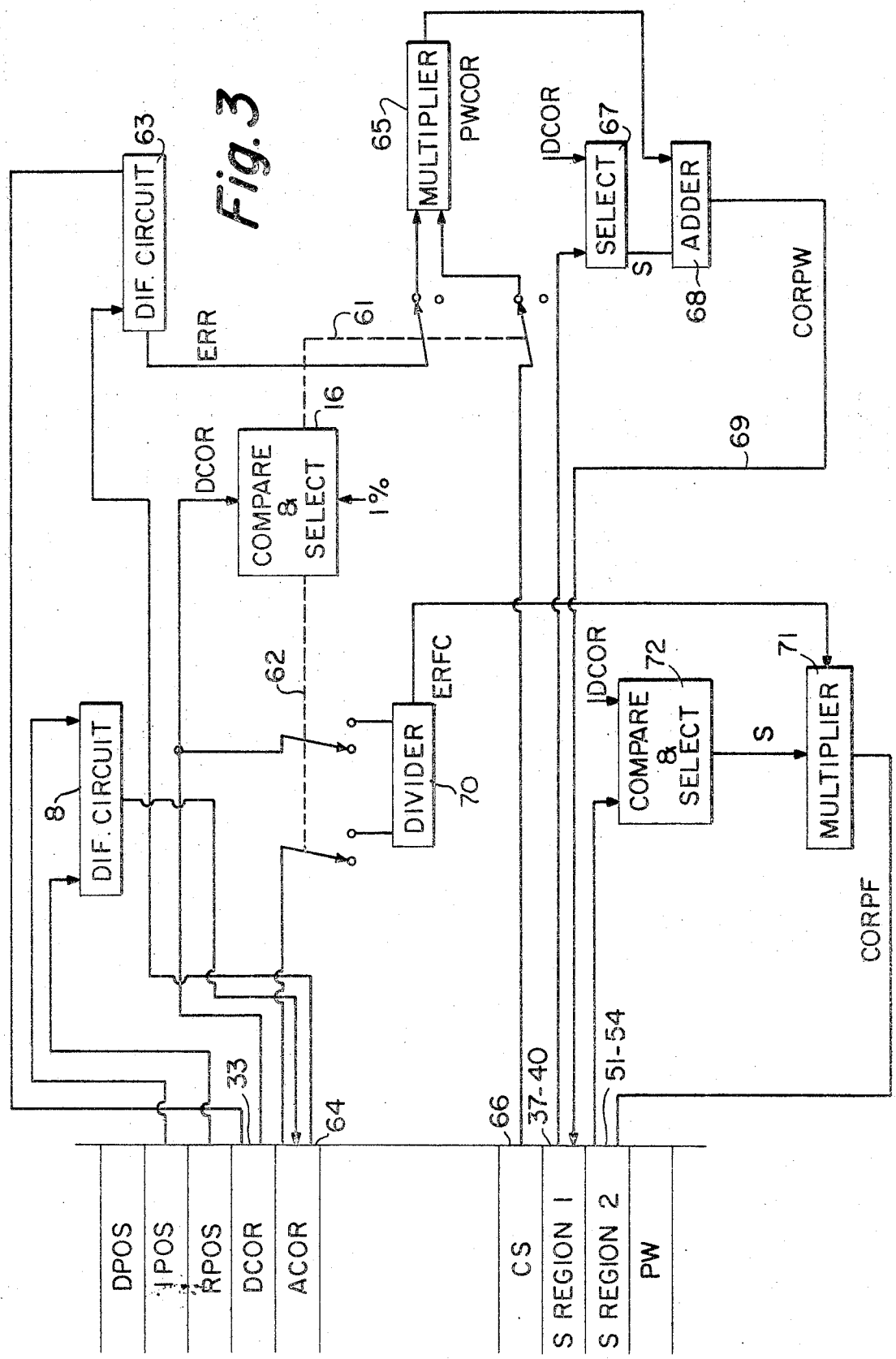

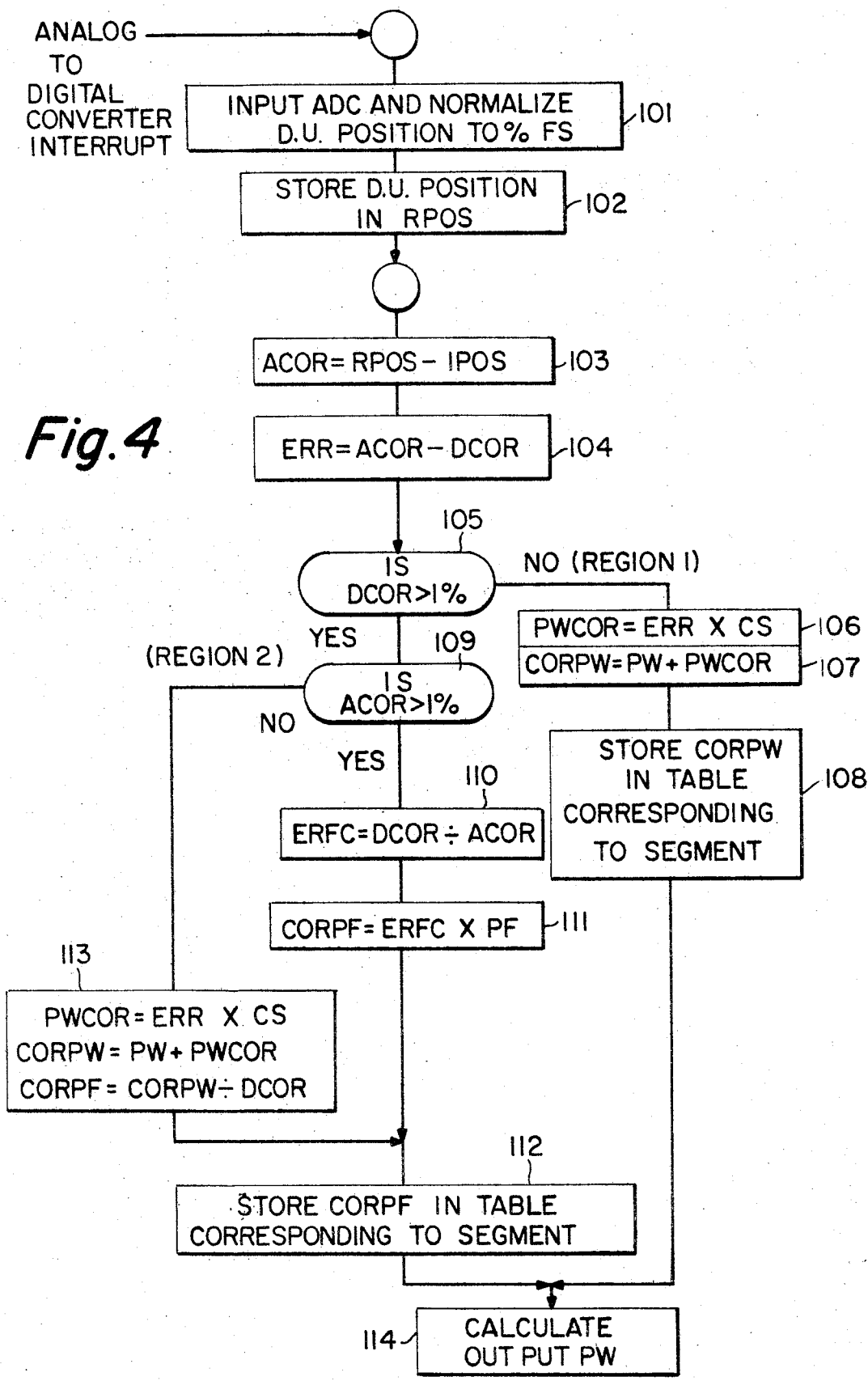

PW = PULSE WIDTH OUTPUTTED TO VALVE ACTUATOR

E = LEARNING TABLE ENTRY FOR ACTUATOR WITHOUT HYSTERESIS.

H = HYSTERESIS

PULSE WIDTH DETERMINATION LOGIC FOR ACTUATOR WITH HYSTERSIS.

LEARNING LOGIC FOR ACTUATOR WITH HYSTERESIS

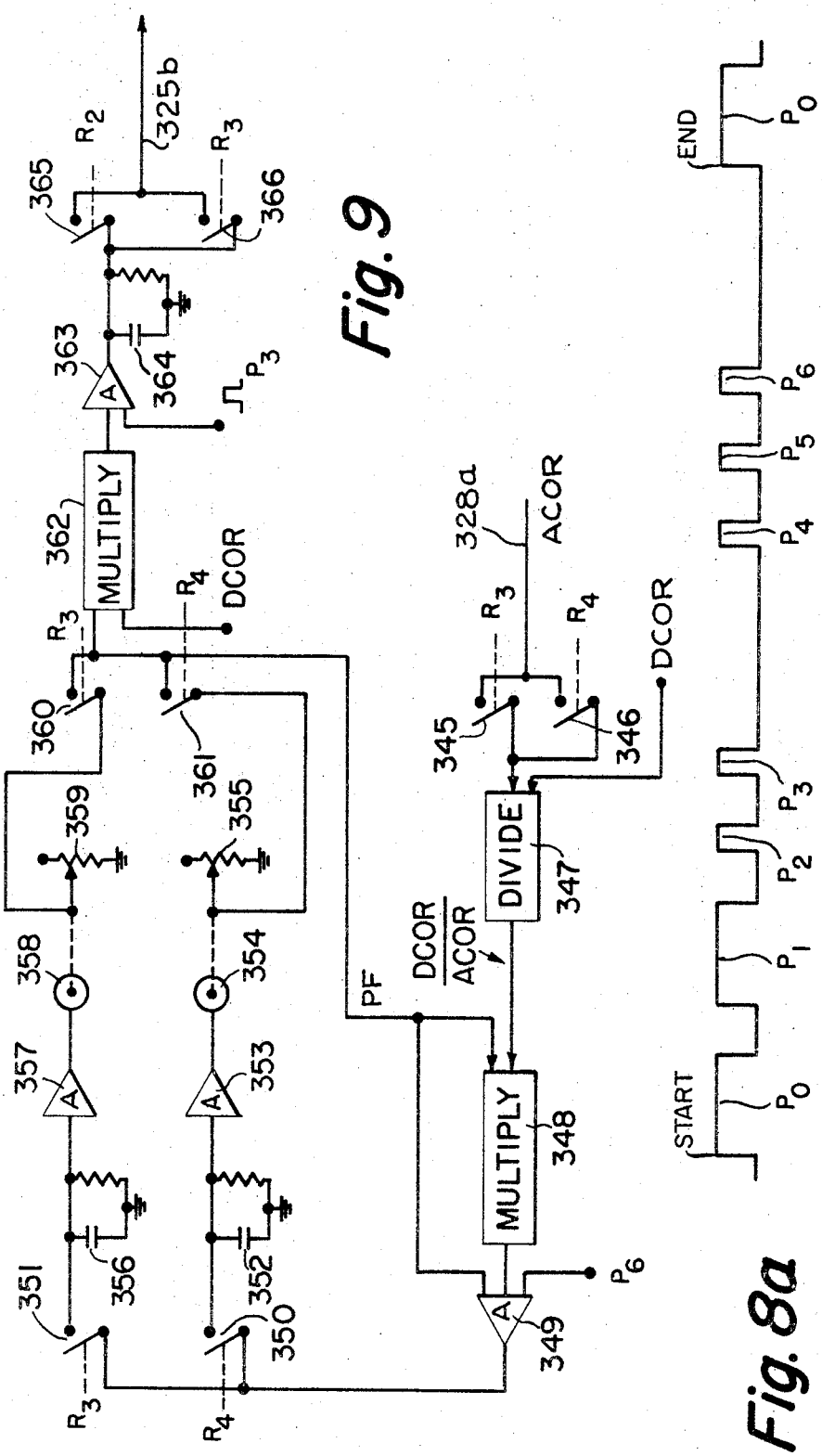

LEARNING CONTROL OF ACTUATORS IN CONTROL SYSTEMS

BACKGROUND OF THE INVENTION

Conventional analogue feedback control of certain types of valve actuators, such as electric drive units, is not completely satisfactory because of their varying characteristics. Such conventional analogue feedback control is described, for example, in PROCESS INSTRUMENTS & CONTROLS HANDBOOK, Douglas M. Considine, Editor-in-Chief, McGraw-Hill Book Company, Inc., 1957, Chapters 9 and 10.

Direct digital control systems have been built in which a digital computer is provided to control a plurality of pneumatic actuators. One example of such a system is described in THE FERRANTI SYSTEM AND EXPERIENCE WITH DIRECT DIGITAL CONTROL, C. M. Cundall and R. A. Morley, IEEE International Convention Record, 1965, Part 3, p. 90. The availability of a digital computer in such a system is made use of in accordance with the present invention to learn the characteristics of the actuators and to update the actuator command signals in accordance with the learned characteristics.

Various learning techniques have previously been proposed for control systems. See, for example, LEARNING SYSTEMS FOR AUTOMATIC CONTROL, Jack Sklansky, IEEE Transactions on Automatic Control, Vol. AC-11, No. 1, p. 6, Jan. 1966; and A SURVEY OF LEARNING CONTROL SYSTEMS, Jerry M. Mendel, ISA Transactions, July, 1966, p. 297. The application of learning control to actuators in accordance with the principles of the present invention provides cost reduction, and/or significantly improved operation, and/or reduction in computer usage.

SUMMARY OF THE INVENTION

This invention is directed to a learning control technique which learns the characteristics of actuators, or of variables which are responsive to actuators, or of composites of actuators and variables responsive to actuators.

Learning control is applicable to actuators that are operated by discontinuous time duration signals. The electric drive unit and the solenoid valve-operated pneumatic actuator fall in this category. The former is operated by controlling the closure time of a switch that applies electric power to the motor, while the latter is operated by controlling the open time of a valve that applies an air pressure source to or releases air pressure from a pneumatic actuator Such operation of a pneumatic actuator is described in the aforementioned Cundall and Morley paper.

Learning control operates as follows. A demand for valve position correction is received by the learning control system. This system derives from a table of command signals, stored in memory, the time duration that power is to be applied to the actuator to produce the desired travel. The pulse width is applied and, after enough time has elapsed to allow the actuator to come to rest, the resultant travel is compared with the expected travel and the table is corrected by an amount related to the error. Thus, the table of command signals, which will be referred to as the learning table, learns the pulse width versus travel characteristic of the actuator and adapts to any changes regardless of their cause, providing automatic compensation for these changing conditions.

In another execution of the same procedure, the learning table consists of numbers proportional to voltages which are applied to a capacitor external to the computer. The actuator is operated until the capacitor discharges. After the actuator comes to rest, the resultant travel is compared with the expected travel and the table is corrected as before. Thus, the table learns the relation between the voltage that is applied to the capacitor and the resultant travel of the actuator.

A number of separate actuator signals derived from the stored table may be applied to the actuator in sequence to obtain the desired motion. The table from which such a sequence is obtained is corrected by an amount related to the difference between the total travel that results and the expected travel. This procedure may give better performance when hysteresis or backlash is present in the actuator.

Position control of an electric drive unit is difficult because it coasts by a large amount after power is removed. Thus, when the drive unit is placed in a feedback loop, hunting will occur unless an appreciable dead band is provided. This comes about since the feedback loop compares the desired position with actual position and terminates power to the drive unit when the position error is zero while the motor continues to move, resulting in an error of opposite polarity. One simple way to prevent this hunting process is to decrease the sensitivity of the feedback loop so that the error resulting from the coast does not cause power to be reapplied. The result is a dead band which, frequently, would be greater than tolerable.

Other methods of preventing hunting without causing excessive dead band will not be described here but they have in common the need for tuning for the prevailing set of conditions such as load, line voltage, grease viscosity, etc. Learning control provides automatic compensation for changes in these environmental factors.

Learning control can provide a position resolution which is equal to the resolution of the valve position measurement since the entries in the learning table are computed from measurements of valve position. This has been obtained experimentally with a measurement system that had a resolution of 0.02 percent of full travel. Furthermore, the resolution was maintained despite changing conditions, such as changes in load, which have a large effect on coast.

Another advantage of learning control is that the drive unit will move to a new position in minimum time. Some control schemes for reducing dead band attempt to slow down the drive unit by interrupting power as it approaches the desired position so as to reduce overshoot. The learning control technique turns power off at the proper time so that the drive unit comes to rest at the desired position, allowing the drive unit to operate at higher speed or at the maximum speed for a longer time.

Another advantage of learning control is that a low cost memory element can be used external to the computer to reduce computer usage without increasing the costs substantially. This can be understood by examining a conventional method for applying time duration output information to an external memory element. In this method, the contents of a memory cell are transferred in parallel to an external memory element which could be a register-counter. The resister-counter is subsequently counted down to zero to produce the desired time duration signal to be applied to the actuator. Since the external memory element is within the learning feedback loop, when learning control is used, highly stable elements such as register-counters, which are expensive, are not required. The learning process would learn the characteristic of the composite of the actuator and a less stable memory element. Thus, a low resistor-capacitor-amplifier combination could be used to provide external memory. The capacitor would be charged to a voltage as determined by the learning table. A time duration signal is generated and is terminated when the amplifier detects that the capacitor has discharged to a particular level. The resultant time duration would be the desired actuator signal. Drifts of the amplifier offset, gain etc., and drifts in the values of the resistor and capacitor would be compensated for by the learning process in a manner similar to the compensation for changes in valve characteristics.

Another advantage of learning control is cost reduction due to the elimination of certain parts required to transfer the actuator position information stored in computer memory to the actuator. Conventional methods of doing this are described in THE COMPUTER ACTUATOR INTERFACE, R. A. Harris, Control Engineering, Sept. 1966. The methods require an actuator positioner to be used which accepts the position information from the computer and then positions the actuator. Learning control allows the computer signals to operate directly on the actuator to position it properly, thereby eliminating the need for an actuator positioner.

The invention also has advantages when applied to control systems which are entirely analogue in nature. In accordance with one embodiment of the invention, an analogue storage element, such as a potentiometer driven by a motor, is updated in response to the error between the desired correction and the actual correction. This analogue embodiment of the invention may be used where only a few drive units are to be controlled. In this case, the economics would not permit the use of a digital computer to control the drive unit.

In summary, learning control of actuator units provides better performance, lower cost, and increased reliability. These advantages are due to the automatic adaptation to changing characteristics of the actuator and of any components in the learning feedback loop, and the elimination of certain parts.

DESCRIPTION OF THE DRAWINGS

FIG. 1b shows a block diagram of the actuator and computer;

FIG. 2 shows a block diagram of the pulse width selection;

FIG. 2a shows pulse width characteristics versus output travel of the actuator;

FIG. 3 shows a block diagram of the learning procedure;

FIG. 4 is a flow sheet of the learning procedure;

FIG. 8a is a timing diagram of the clock pulses used in the system of FIGS. 8 and 9; and FIG. 9 is a block diagram of the analogue updating equipment.

Referring to FIG. 1a, a process control system is shown. The process to be controlled is indicated at 1a, and one of the actuators for controlling the process is indicated at 2a. The actuator 2a may control a valve or other element to which the controlled or measured variables of the system are responsive. The measured variable, which may be any of the critical parameters of the system such as a flow signal on the line 5a, is compared with a set point at the summing point 3a. The difference between the set point and the measured variable is produced at the output of the summing point 3a. This difference is applied to a process controller 4a which changes the position of the actuator 2a in accordance with the magnitude of the difference. The process controller 4a may be a conventional analogue controller of the type having proportional rate and reset control actions or it may be a digital controller which also will incorporate these control actions.

Figure 1A:
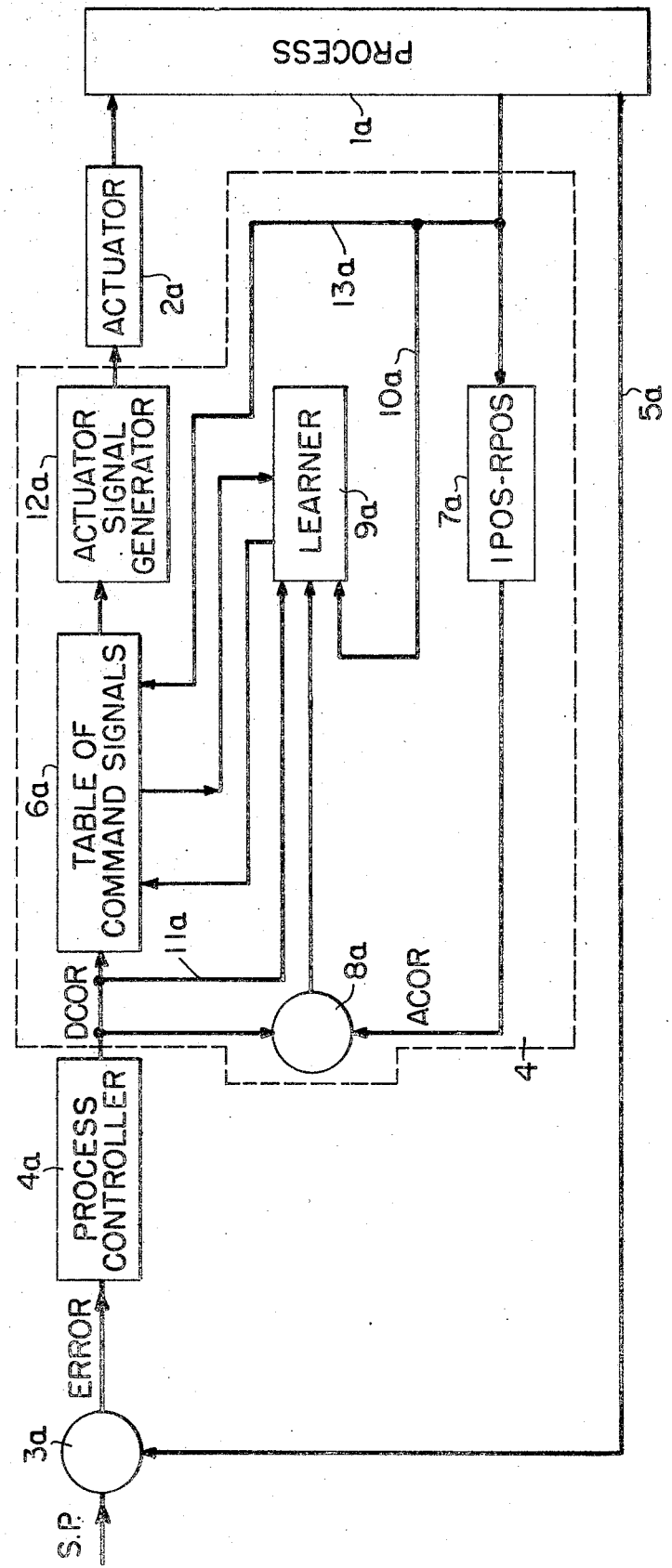
FIG. 1a is a block diagram of the system.

The process controller 4a generates a signal representing the desired correction for the process, denoted DCOR. This is applied to the computer 4 included in the dashed lines. The desired correction signal is used to select a command signal from the table of command signals 6a. From the command signal the actuator signal generator 12a derives an actuator signal which will move the actuator 2a to its desired position. This actuator signal is a time duration signal specifying the time duration that power is applied to the actuator 2a.

In accordance with the principles of this invention, the command signal is modified by the difference between the desired correction. The actual correction is generated as follows. The signal representing a controlled variable is applied to a difference circuit 7a which obtains the difference between the initial position of the controlled variable at the beginning of a cycle and the resultant position of the controlled variable at the end of a cycle. The signal thereby generated, denoted ACOR, is the actual correction obtained in response to a particular actuator signal. The actual correction is compared with the desired correction at the error function generator 8a to generate an error signal. The learning system, or learner, 9a is used to modify the command signals from the table of command signals 6a.

While the system has been described as a process control system, it will be understood that the invention will have applicability to other systems such as load frequency control for power systems.

While many modifications will be suggested by the detailed description to follow, several modifications can be described with reference to the block diagram of FIG. 1a. While the difference circuit 7a is shown responsive to a controlled variable in the process, it may also be responsive to the output position of the actuator 2a. In subsequent embodiments, the system will be described as controlling a valve actuator wherein the difference between the initial position and the resultant position of the valve is obtained in the difference circuit 7a. Also, while the difference circuit 7a and the summing point 3a have been shown as being responsive to different variables, it will be appreciated that the same variable could be applied to both. For example, flow rate could be applied to both the difference circuit 7a and the summing point 3a.

As indicated by the line 10a, the controlled variable may be applied to the learner 9a. In this case, the learner 9a is responsive to the level of operation of the process. The learner will update the command signals in the table 6a in a particular manner depending upon the level of operation of the process. Also, a different table of command signals can be used depending upon the level of operation of the process as indicated by the controlled variable on the line 13a. For example, when the valve is 80 percent open, one table of values will be used by the actuator 2a and will be updated by the learner 9a; whereas, with the valve 20 percent open, another table of command signals will be used.

As another feature of the invention, the desired correction will be applied to the learner as indicated by the line 11a. This is desirable in situations where the table contains values which must be modified in different ways; that is, with a different mode or region of operation of the learner. The magnitude of the desired correction, for or whether it is above or below a predetermined value, will control the region of operation. For example, in one region the command signal in the table may be multiplied by the ratio of the desired correction to the actual correction to obtain the new updated command signal. In another region, a correction is added to the command signal to update it.

The principles of this invention can be implemented with a special purpose digital computer, analogue devices, combination of analogue and digital devices, or by use of a general purpose digital computer. Normally, when the invention is used in a direct digital control system, the general purpose digital computer will be used because it is already present in such a system.

Referring now to FIG. 1b, there is shown the actuator 1 which may be an electric drive unit or solenoid valve-operated pneumatic diaphragm actuator connected to a valve. Examples of commercially available units are L&N Catalog No. 11274 Electric Drive Unit and Mason-Neilan Diaphragm actuator equipped with solenoid valves Type V7/11, manufactured by Baldwin Fluid Power, Ltd., England.

The output position of the actuator is sensed as indicated by the potentiometer 2 having a movable contact 3 which is positioned along the potentiometer in accordance with the output position of the actuator. The contact 3 has a signal thereon representing the actual position of the actuator at the beginning of a control cycle of the digital computer 4.

The actual position signal is applied through analog-to-digital converter 5 to the digital computer 4. The position signal is thus sampled. The position of the actuator is the position to which the actuator was driven by a signal obtained during the previous control cycle. This is referred to as the initial position, denoted IPOS. A pulse width signal is supplied to the actuator 1 which will move it from its initial position to a desired position, denoted DPOS. After the movement is completed, the position of the actuator is again sampled through the analog-to-digital converter 5 to obtain a resultant position signal denoted RPOS. The resultant position signal is stored in the RPOS register 6. It will be appreciated that it will not be necessary to sample the position of the valve twice during each cycle as has been described. Rather, most often, it will be desirable to sample the position of the actuator only once during each cycle and to transfer the resultant position signal in the register 6 to the initial position register 7 for use during the next cycle. However, for simplicity, the system has been described as including two readings of the position of the actuator during each cycle of operation.

At the beginning of each control cycle, a computation of desired position of the output of the actuator is made. This computation is made from external data as indicated at 12. For example, where the actuator is a valve and pressure is being controlled, the external input might be actual pressure P, actual temperature T, and flow F which are all combined at 12 to compute a desired valve position which will maintain pressure at the proper level. The operation of a computer in determining the desired position of an actuator is described, for example, in the aforementioned Cundall and Morley paper. This desired position of the actuator is denoted DPOS and is stored in register 13. The difference between the desired position DPOS and the initial position IPOS, taken from the IPOS register 7, is obtained in the difference circuit 14. The difference between the desired position and the initial position of the actuator is denoted ECOR and is stored in register 15.

The magnitude of the desired correction is used to determine which of two regions will be used in determining the pulse width to be applied to the actuator and which of two corresponding procedures will be followed by the learning technique. If the desired correction DCOR is greater than a predetermined value, for example, 1 percent, a pulse width determination and the learning technique, which will be referred to as Region 2, will be followed. If the desired correction is less than 1 percent of the full scale output travel of the actuator, a pulse width determination and a learning technique, which will be referred to as Region 1, will be followed.

As indicated at 16, the magnitude of DCOR is compared to 1 percent. If it is less than one percent, a selection is made of the pulse width selection procedure, denoted 17, and the updating or learning procedure, denoted 9. This selection is denoted by the positioning of the switch 18 and the switch 19 in their upper positions, indicating a flow of the required data to the pulse width selection procedure 17 and the updating procedure 9.

If the magnitude of the desired correction DCOR is greater than one percent, the switches 18 and 19 will be positioned in their lower positions thereby applying the required data to the pulse width selection procedure, denoted at 20, and to the updating procedure, denoted at 10. Of course, it will be understood that the mechanical switches 18 and 19 merely indicate the selection of a routine to be followed by the computer. If the desired correction DCOR is greater than 1 percent, the routine which has been denoted Region 2 is to be followed. The routines or procedures which have been indicated at 9, 10, 17 and 20 in FIG. 1b, will subsequently be described in more detail with reference to FIGS. 2 and 3. The updating procedure 9 will supply an updated command signal, which is representative of the actuator characteristic, to the stored table of command signals for the pulse width selection procedure 17. The command signals of this table are updated in the updating procedure 9.

In a similar manner, the updating procedure 10 receives command signals from the pulse width selection procedure 20, updates the command signals, and returns them for storage in a table.

The actuator signal corresponding to the selected command signal from pulse width selection procedures 17 or 20 is inserted into the register 21. At periodic times, which will be the interrupt times for the computer 4 and which occur many times during a control cycle, the pulse width signal is compared with zero. This comparison is made in comparator 22. A source of interrupt pulses has been shown as applied to the input line 23. At each interrupt time, the comparator 22 produces an output on the UP line 24, or an output on the DOWN line 25, or an output on the STOP line 26. At each interrupt time, the pulse width signal stored in register 21 is decremented by one. Stated in another way, each interrupt pulse subtracts one count from the register 21 until the PW signal stored therein is zero. Outputs from comparator 22 are used to set and reset the flip-flops 27 and 28. When the UP output line 24 has a signal thereon, the flip-flop 27 is set. The output of this flip-flop is applied to the actuator 1 to cause an increase in the output as long as the flip-flop 27 is set. Conversely, when the flip-flop 28 is set by an output on the DOWN line 25, the actuator 1 will have its output decreased until the flip-flop 28 is reset. Flip-flops 27 and 28 are reset when an output appears on the STOP line 26. This indicates that the pulse width signal in the register 21 has been counted down to zero. That is, this signifies that the pulse width signal has been applied to the actuator 1.

After the actuator 1 has fully responded to the actuator signal, the position of the actuator is sampled through the ADC 5 to insert a resultant position signal in the RPOS register 6. The command signal is updated by using the resultant position signal in register 6 and signal representing the initial position of the actuator which is stored in IPOS register 7.

The initial position signal IPOS in register 7 is subtracted from the resultant position signal RPOS in difference circuit 8 to provide as an output the actual correction signal, denoted ACOR. From the actual correction signal ACOR, an error can be determined by comparing the actual correction with the desired correction. The command signal is updated, using ACOR and DCOR, by one of the updating procedures 9 or 10.

In order to supply the desired correction to the updating procedures 9 or 10, a desired correction has been shown as stored in the register 11.

Referring now to FIG. 2, there is shown the details of the selection of the pulse width for the actuator which were indicated generally at 17 and 20 in FIG. 1b. The circuitry of FIG. 2 selects the actuator signal which is stored in the PW register 21 of FIG. 1b.

In FIG. 2, there is shown a plurality of storage cells. The initial position IPOS of the actuator is stored in storage cell 31. The desired position DPOS is stored in storage cell 32. The difference between the initial position IPOS and the desired position DPOS is obtained by the difference circuit 14 which produces as an output the desired correction DCOR. The desired correction is stored in the storage cell 33. The desired correction DCOR is compared to 1 percent of full scale travel of the actuator to determine whether it is larger or smaller than this value. This operation is as indicated at 16. The compare and select operation 16 makes the decision, indicated by the two-position switch 18, to place the computer in either Region 1, indicating a desired correction less than 1 percent of full scale travel, or in Region 2, indicating a desired correction of greater than 1 percent of full scale travel.

Assume that the desired correction is less than 1 percent so that the routine indicated by Region 1 is followed as indicated by the switch 18 being in the position shown in FIG. 2. In this routine, a determination is made as to which of the values, .1 percent, .3 percent, .5 percent, and 1.0 percent, DCOR is closest to. If the desired correction is closest to a value of .1 percent, the compare and select circuit 36 selects the command signal stored in the storage cell 37. This selection is indicated by a positioning of the four-position switch 35 in the position shown. If the desired correction is closest to .3 percent, the command signal stored in the cell 38 is selected. If the desired correction is closest to .5 percent, the command signal stored in the storage cell cell 39 is selected. If the desired correction is closest to 1.0 percent, the command signal stored in the cell 40 is selected. The selected command signal is transferred, as indicated by the line 41, to the storage cell 42 where it is stored as the actuator signal PW which, when converted to the corresponding pulse width, will produce actuator travel.

The last step in the Region 1 routine is to replace the value of DCOR contained in storage cell 33 with the value of the selected correction. That is, if the compare and select circuit 36 has determined that the desired correction DCOR is closest to .1 percent, then the value of .1 percent, which is the selected correction, is placed into storage in the storage cell 33. In the drawing of FIG. 2, this operation is indicated by operation of the switch 58 to one of its four indicated positions. In the position shown, the selected correction of .1 percent will be transferred through the contact of switch 58 and over line 59 into the storage cell 33 for use as the value of DCOR in the subsequent updating procedure.

The four command signals stored in the storage cells 37—40 have been denoted S1 Region 1; S2 Region 1; S3 Region 1; and S4 Region 1. These designations indicate that in Region 1 the actuator characteristics are broken up into the four segments S1, S2, S3 and S4. This can best be understood with reference to FIG. 2a showing the characteristics of an electric drive unit. FIG. 2a shows the pulse width time in cycles of line power as ordinate versus the percent of full scale travel as abscissa. Three curves are shown in FIG. 2a. The curve 43 shows the output travel as a function of the input signal when the actuator is working against 50 percent full load, and the curve 45 shows the output travel as a function of input signal when the actuator is working with the full load. It will be noted that the curve 43, where the actuator is working against the load, that is, where it must provide a torque to move the load, is quite different from the curve 45 where the movement of the actuator is in a direction such that the load is helping the actuator to move. For the same number of cycles of line power less output travel is produced against full load than when the travel is with the load. The characteristics of the actuator in moving with no load are almost the same as those depicted by the curve 45 for motion in direction of full load.

The positioning of the actuator when the Region 1 condition exists, that is, when less than 1 percent of full scale travel is desired is a very difficult one. When small output travels are required the stiction (i.e., static friction) and friction of the actuator presents a real problem. For example, referring to the curve 43, note that 5 cycles of line power must be applied to the actuator to produce any output travel at all. Also, actuators of the type to be controlled, such as large electric drive units, have coast. The momentum of the moving element will continue to produce movement of the actuator output after the input signal is discontinued. Often this will carry the actuator past the desired position. Prior art controllers using analogue loops have not been completely satisfactory because the coast of the actuator together with other factors, in some cases the friction and stiction of the drive unit, combine to produce hunting around the desired position. In order to avoid this, prior art controllers having a local analogue feedback loop, have a built-in dead band. While the dead band avoids hunting of the actuator, it does place a limit on the resolution of the actuator. That is, because of the dead band the output travel of the actuator cannot be controlled to a very precise accuracy. The actuator cannot be positioned to an accuracy which is any better than the dead band of the controller.

Many of the disadvantages of prior art controllers having analogue control loops are avoided in accordance with the present invention.

Referring particularly to the curve 43, the characteristics of the actuator have been divided into four segments. The segment S1 Region 1 is applicable when the desired travel is between .05 percent and .2 percent; the segment S2 Region 1 is applicable when the desired travel is from .2 percent to .4 percent; segment S3 Region 1 is applicable from .4 percent to .75 percent; and segment S4 Region 1 is applicable from .75 percent to 1.0 of full scale travel. When the desired correction is between .75 percent and 1.0 percent, the signal S4 Region 1 produces a travel of 1.0 percent; when the desired correction is from .4 percent to .75 percent, the segment S3 Region 1 produces a travel of .5 percent, and so on. It should be noted that if the desired correction is below .05 percent, then no correction signal is applied to the actuator. That is, if the correction is in the region 0.0 percent to .05 percent, no correction will be applied. This is the resolution of the positioning capability of the system.

While the system has been described with only four segments, as many as are required to achieve the desired resolution could be provided. For example, in the system under consideration if another entry were used at .5 percent, then the resolution of the system would be .025 percent provided that the measuring equipment for the system has a resolution as good as this. The great advantage of the present system is that a sufficient number of segments can be provided to take the full advantage of the resolution of the other parameters, such as the measuring resolution which the system has. If sufficient segments are used, the output travel resolution of the system will match the measurement resolution of the system. In a normal analogue loop controller the resolution is dependent upon the coast characteristics of the actuator.

It should be noted that by breaking up the characteristics into segments as has been done, it is possible to provide a command signal which will most nearly produce the desired output travel. The characteristics are nonlinear and because of stiction the characteristic curves do not pass through the origin. In controlling a drive unit having these characteristics, it is desirable to use a plurality of segments and to store a command signal for each segment of the characteristic curve.

A learning table of command signals is provided for each direction of travel of the actuator. Since the actuator characteristics against full load as indicated by the curve 43 are quite different from the actuator characteristics with the full load as indicated at 45, a separate set of command signals can be stored for producing output travel in the direction in which the actuator is moving with the load. The problem of different characteristics of the actuator with and against the load is one which is not easily solved in a controller having a conventional analogue feedback loop. The problem is, however, easily solved in accordance with the present invention by providing a separate table of command signals for each direction of travel.

Returning now to FIG. 2, there will be discussed the operation of the system when the desired correction DCOR is greater than 1 percent, that is, the Region 2 condition. When a Region 2 condition exist, as indicated by the switch 18 being in its right-hand position, the desired correction signal DCOR is applied to the compare and select circuit or unit 50 to determine whether the desired correction is in the range 1.0 percent to 2.0 percent, in the range 2.0 percent to 4.0 percent to 8.0 percent or greater than 8.0 percent. Depending upon this determination, one of the command signals stored in the storage cells 51—54 will be selected. The selection of one of the command signals is indicated by the switch 55 which is set to one of four positions by the compare and select circuit at 50. These signals are denoted S1 Region 2 ...S4 Region 2 and are denoted PF for proportional factor.

When the proper command signal has been selected, it is supplied over line 56 to the multiplier 57 where it is multiplied by the desired correction. The result of this multiplication of a command signal by the desired correction produces an actuator signal representing the pulse width, or number of cycles of line power to be applied to the actuator to move it to the desired position. This signal again is stored in the storage cell 42 and the signal is denoted PW.

The updating procedure shown in FIG. 3 will also take the form of two different routines depending upon whether the value of DCOR is in Region 1 or in Region 2. Therefore, again there has been shown at 16 an operation indicating that the value of DCOR is compared with 1 percent. If the value of DCOR is equal to or less than 1 percent, the Region 1 routine is followed, otherwise the Region 2 routine is followed. The Region 1 routine is indicated by the switches 61 and 62 being in the position shown. That is, the switch 61 contacts are closed and the switch 62 contacts are open. Conversely, in the Region 2 condition the contacts of switch 62 are closed and the contacts of switch 61 are open.

Assume that the Region 1 routine is to be followed. The desired correction, that is .1 percent, .3 percent, .5 percent or 1.0 percent has been inserted into the storage cell 33. This value of desired correction DCOR is applied to the difference circuit 63 which produces an output which is the difference between the value of DCOR and the value of the actual correction. The actual correction, denoted ACOR, is stored in the storage cell 64. As was previously discussed with regard to FIG. 1b, the value ACOR is the difference between the resultant position RPOS and the initial position IPOS.

The result of the difference operation carried out at 63 is an error signal denoted ERR. In the Region 1 routine the value of ERR is multiplied by a constant as indicated by the multiplier 65. The constant, denoted CS, is stored in the storage cell 66. The product of this multiplication is denoted PWCOR. This value is added to the selected command signal. It will be noted that in FIG. 3 only one storage cell has been used to denote the storage cells 37—40 in FIG. 2. Also, in FIG. 3, the actual selection of the proper command signal for a particular segment has not been shown but this selection has been indicated generally at 67. The operation at 67 indicates that the command signal corresponding to DCOR is selected for updating. The command signal which has provided the pulse width applied to the actuator is thus selected for updating and applied to the adder 68. The value PWCOR is algebraically added to the command signal and the updated command signal is transferred over the line 69 to the appropriate one of the storage cells 37—40 replacing the contents of this cell with the new value that is obtained from the adder 68.

Now consider the Region 2 routine. If the desired correction is greater than 1 percent, the Region 2 routine is followed as indicated by a positioning of the switch 62 to its closed position. The contacts 61 are simultaneously opened. In this case, the desired correction, which will be the actual value of the desired correction, will be applied to the divider 70. Divider 70 forms the quotient of DCOR divided by ACOR, which quotient is an error factor denoted ERFC. The error factor is multiplied by the selected command signal to form an updated command signal. This multiplication is carried out at 71. Again, the selection of the appropriate command signal from one of the storage cells 51—54 is indicated generally at 72. The updated command signal is denoted CORPF and is reinserted into the appropriate one of the storage cells 51—54.

Figure 5:
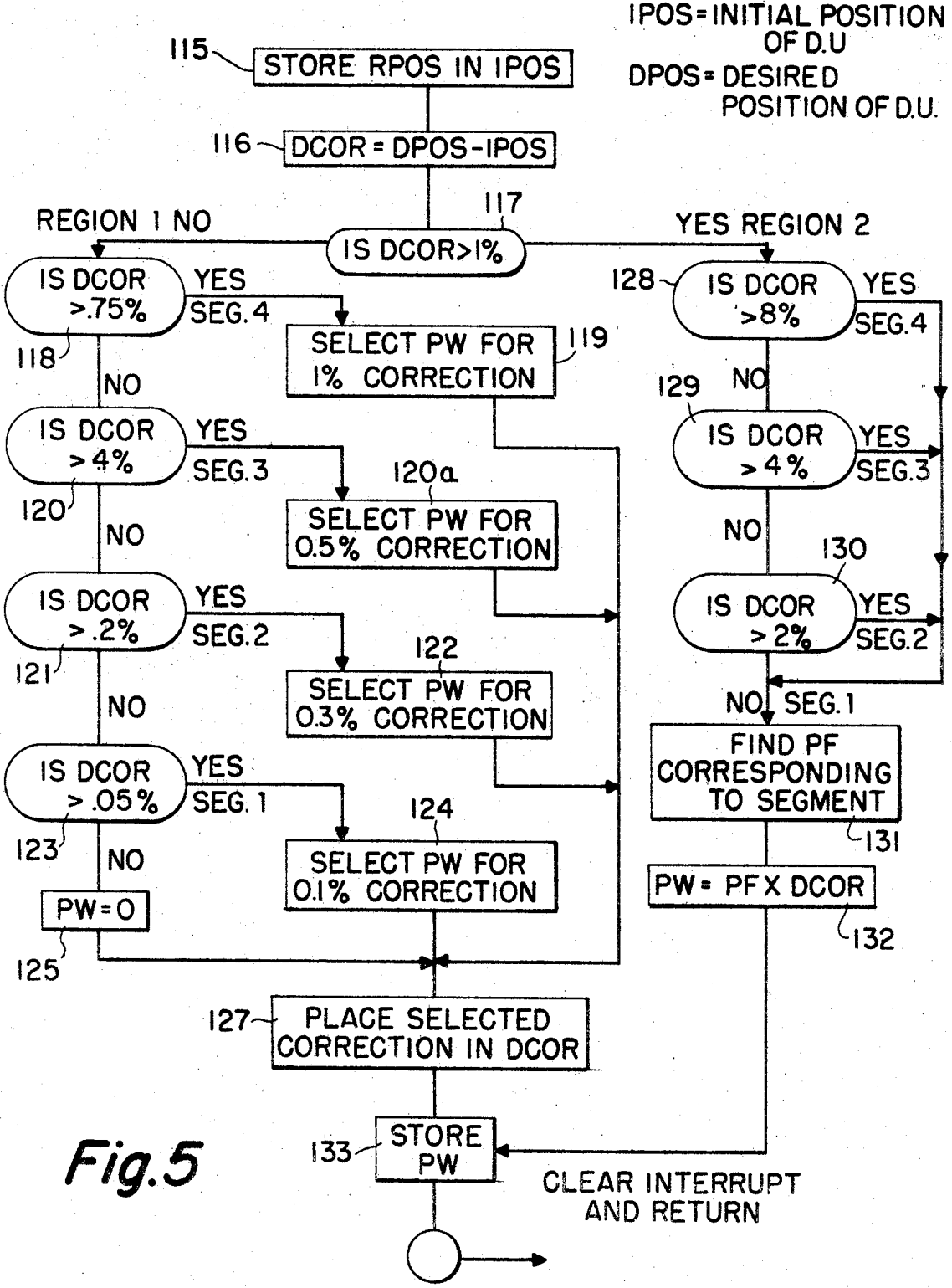
FIG. 5 is a flow sheet of the pulse width selection.

The operation of the system can be better understood with reference to the flow charts shown in FIGS. 4 and 5. Referring to FIG. 4, the position of the drive unit is converted to a digital signal and normalized to a percent of full scale travel of the actuator as indicated at 101. The drive unit position signal is designated RPOS and is inserted into storage in a cell given this designation as indicated at 102.

At 103 the difference between the position of the actuator at the beginning of the cycle and the position of the actuator at the end of the cycle is obtained. This difference, denoted ACOR, is the actual correction obtained during that cycle. The error between the actual correction ACOR and the desired correction DCOR is obtained as indicated at 104. The error between actual correction for each cycle is denoted ERR.

A determination is made at 105 as to whether the desired correction is greater than 1 percent. If the desired correction is equal to or less than 1 percent, the Region 1 routine is followed in updating the command signals. In this case, a correction for the pulse width signal is obtained by multiplying the error ERR by a constant CS as indicated at 106. A corrected pulse width signal, denoted CORPW is obtained by adding the pulse width correction PWCOR is one type of command correction signal. The pulse width signals PW are the command signals for the various segments, these signals being previously denoted S1 Region 1, S2 Region 1, S3 Region 1, and S4 Region 1. The corrected pulse width signal CORPW is reinserted into storage in the proper storage cell as indicated at 108.

If the desired correction is greater than 1 percent, as indicated by the determination made at 105, then the Region 2 routine is followed. In order to resolve the anomalous situation where the desired correction is greater than 1 percent but the actual correction is 1 percent or less, the actual correction ACOR is compared with 1 percent as indicated at 109. Normally, the actual correction will be greater than 1 percent if the desired correction is greater than 1 percent, but if it is not, a routine to be subsequently described will be followed.

Normally, the processing continues by generating an error factor ERFC (another type of command correction signal) which is the quotient of the desired correction DCOR and the actual correction ACOR. This step is indicated at 110 in FIG. 4. At 111, a corrected proportional factor CORPF is obtained by multiplying the error factor ERFC by the selected command signal which, in this case, is denoted PF. The corrected proportional factor CORPF is returned to storage in the proper storage cell as indicated at 112.

The routine indicated at 113 in FIG. 4 is effective when a desired correction greater than 1 percent is called for but an actual correction which is less than 1 percent is obtained. Note that is this case, if the normal routine were followed of determining the error factor ERFC, i.e., dividing the desired correction by the actual correction, a large error might occur, particularly if the actual correction was a very small value. In this case, the error factor ERFC would be obtained an extremely large updated proportional factor CORPF. If this updating procedure were followed, the corrected PF could produce an unduly large output travel of the actuator. The PF would not converge to the correct value.

In this situation, instead of following the normal procedure, a procedure of updating similar to that followed for the Region 1 condition is used. As indicated at 113, a value of pulse width correction, PWCOR, (which is a type of command correction signal), is obtained by the product of the error ERR times the constant CS. Then a corrected pulse width CORPW is obtained by adding the value PWCOR to PW where PW is the pulse width that had previously been outputted to the actuator as a result of a Region 2 pulse width calculation. Since, in the Region 2 condition, a proportional factor is stored instead of a pulse width, the value of corrected pulse width CORPW must be converted to a value of corrected proportional factor CORPF. This conversion is accomplished by dividing the value of corrected pulse width by the desired correction DCOR. This value of corrected proportional factor is then stored.

The final step shown in FIG. 4 at 114 is the calculation of the output pulse width PW to be used to move the actuator. In the Region 1 routine the command signal selected from storage will directly represent the pulse width required to give an increment of travel of .1 percent, .3 percent, .5 percent, or 1.0 percent. In the Region 2 situation, the output pulse width is determined by multiplying the proportional factor PF selected from storage by the desired correction DCOR to obtain the output pulse width to be stored in the register 21 of FIG. 1b and to be used for actuating the drive unit.

Referring to FIG. 5, there is shown a block diagram of the selection of the proper command signal form storage. In FIG. 5, the resultant position from the previous cycle is transferred to the storage cell for the initial position to serve as the initial position signal IPOS for the present cycle. This step is indicated at 115.

The desired correction is computed as the difference between the desired position DPOS and the initial position IPOS as indicated at 116.

A determination of whether the desired correction is greater than 1 percent is made at 117. Dependent upon this determination, either the Region 1 or the Region 2 procedure will be followed. In the Region 1 procedure, if the desired correction is greater than .75 percent, the command signal which has been denoted S4 Region 1 is selected as indicated at 118. This causes a PW signal calling for a 1 percent correction in the output of the actuator to be selected from storage as indicated at 119. If the desired correction is not greater than .75 percent, but is greater than .4 percent, the command signal S3 Region 1 is selected as indicated at 120. This, in turn, removes from storage a PW signal calling for a 0.5 percent correction in the output as indicated at 120a.

If the desired correction is not greater than .4 percent but is greater than .2 percent, the command signal designated S2 Region 1 is selected at 121. This in turn removes from storage a PW signal calling for a 0.3 percent correction in the output as indicated at 122. If the desired correction is not greater than .2 percent but is greater than .05 percent, the command signal designated S1 Region 1 is selected as indicated at 123. This in turn calls for a PW signal producing a 0.1 percent correction as indicated at 124. If the desired correction is not greater than .05 percent, no PW correction is selected. This is as indicated at 125. If a PW correction is selected, the selected correction is stored in the storage cell denoted DCOR as indicated at 127.

Consider now the Region 2 routine. If the desired correction is greater than 8 percent, the segment S4 Region 2 is selected as indicated at 128; if desired correction is greater than 4 percent, the segment S3 Region 2 is selected as indicated at 129; if the desired correction is greater than 2 percent, the segment S2 Region 2 is selected as indicated at 130. Otherwise, the segment S1 Region 2 is selected. A proportional factor PF corresponding with the selected segment is removed from storage as indicated at 131. Then, the pulse width is determined by multiplying the PF by the desired correction as indicated at 132. The resultant PW to be used to move the actuator is stored as indicated at 133.

The operation of the system can best be understood with reference to tables showing the changes in the values through several cycles of operation. First, there will be provided a summary of the mnemonics used in describing the operation of the system.

DEFINITIONS OF MNEMONICS NEED IN FLOW CHARTS AND HEADINGS IN TABLES A AND B

IPOS  Initial POSition of drive unit, percent of full travel.
DPOS  Desired POSition of drive unit, percent of full travel.
RPOS  Resultant POSition of drive unit, percent of full travel. This is the drive unit position that results from the PW (pulse width) that the program sends to the drive unit.
P DCOR  Desired CORrection in percentage of full travel. P is the polarity of DCOR. A space in the P column is positive. When DPOS-IPOS is greater than 1 percent, DCOR = DPOS-IPOS. When DPOS-IPOS 1 percent, the desired correction is taken as either 0.1 percent, 0.3 percent, 0.5 percent or 1 percent, whichever is nearest to DPOS-IPOS.
R  Region. A 1 in this column indicates that the desired correction is 1 percent. A 2 indicates that the desired correction is greater than 1 percent.
S  Segment. The number in this column indicates the segment of the table entered. An entry is completely identified by the polarity of the desired correction, the region, and the segment. There are 4 segments in each region. In Region 1, 4 corresponds to 1 percent desired correction; 3 corresponds to 0.5 percent; 2 corresponds to 0.3 percent; 1 corresponds to 0.1 percent. Segment 0 is not an entry but indicates zero pulse width when DPOS-IPOS 0.05 percent. In Region 2, the value of a segment is the Proportional Factor, PF. When in Region 2, the Pulse Width = PF × DCOR. Segment 4 contains the PF to be used when the desired correction is 8 percent. The other entries are as follows:

DCOR range

Segment:
3 ............ DCOR>4%, ≤8%
2 ............ DCOR>2%, ≤4%
1 ............ DCOR>1%, ≤2%

PF  Proportional Factor. Pulse Width, PW = PF × DCOR when in Region 2.
PW  Pulse Width is time duration of power applied to drive unit in cycles of line power.
P ACOR  Actual CORrection of drive unit in percentage of full travel. A space in the P column indicates a positive direction. ACOR is the correction which results from the pulse width applied to the drive unit.
P ERR  ERRor is ACOR-DCOR. A space in the P column indicates positive error or overcorrection.
PWCR  Pulse Width CoRrection. This is the correction to be made to the pulse width previously sent to the drive unit. When in Region 1, PWCR = ERR × CS where CS is the corrective step, a constant. The value of CS in these runs is 1 pulse per 0.1 percent of error. When in Region 1, the table is updated by adding PWCR.
ERFC  ERror FaCtor. When in Region 2, the ratio DCOR/ACOR = ERFC. PF is multiplied by ERFC to form the corrected PF.
CORPW  CORrected Pulse Width. This is the corrected table entry for Region 1.
CORPF  CORrected Proportional Factor. This is the corrected table entry for Region 2.

NOTE: When the desired correction is > 1 percent corresponding to Region 2, and the actual correction is less than 1 percent, the PF is corrected differently from either procedure described above. When a correction smaller than 1 percent occurs, a proportionate correction to the PF obtained by multiplying by ERFC would cause a divergence of the PF. Instead, the error in the correction, ERR, is multiplied by CS and added to PW as for a region 1 correction. The PF corresponding to this pulse width is computed and stored as the corrected PF. See scan 3 in Table A.

The learning control process is illustrated by the following table, the headings of which have been previously defined.

TABLE A

| Run | Scan | IPOS | DPOS | RPOS | P DCOR | R | S | PF | PW | P ACOR | P ERR | PWCR | ERFC | CORPW | CORPF |
|---|---|---|---|---|---|---|---|---|---|---|---|---|---|---|---|
| 5 | 1 | 45.00 | 50.00 | 47.00 | 5.00 | 2 | 3 | 9.99 | 50 | 2.00 | −3.00 | | 2.49 | | 25.00 |
|   | 2 | 47.00 | 50.00 | 48.70 | 3.00 | 2 | 2 | 9.99 | 30 | 1.70 | −1.30 | | 1.76 | | 17.49 |
|   | 3 | 48.70 | 50.00 | 49.40 | 1.30 | 2 | 1 | 9.99 | 13 | .70 | −.60 | 6 | | 19 | 14.49 |
| 6 | 1 | 48.00 | 52.00 | 51.00 | 4.00 | 2 | 2 | 17.49 | 70 | 3.00 | −1.00 | | 1.33 | | 23.34 |
|   | 2 | 51.00 | 52.00 | 52.10 | 1.00 | 1 | 4 | | 23 | 1.10 | .10 | 1 | | 22 | |
|   | 3 | 52.10 | 55.10 | 55.10 | 3.00 | 2 | 2 | 23.24 | 70 | 3.00 | | | 1.00 | | 23.24 |

The foregoing Table A shows the process when the desired corrections are greater than 1 percent corresponding to Region 2. The column marked PF is the PF used in calculating the pulse width PW, which is outputted. The corrected PF is shown in the column headed CORPF which is the updated PF and replaces the previous PF used in calculating the pulse width.

Table A also illustrates the operation of the routine 113 of FIG. 4. Refer to the third row of the table wherein the desired correction is 1.3 percent but the actual correction is only .7 percent. Since the actual correction is less than 1 percent, the routine 113 is followed. In this case, the pulse width correction PWCR is the product of ERR, which is .60, and CS the constant which is 1 pulse per each .1 percent error. The product ERR and CS is 6 pulses, as indicated in the column PWCR.

Next, the corrected pulse width CORPW is obtained by summing the pulse width of 13 with the pulse width correction of 6. There is obtained the corrected pulse width CORPW. This is converted to the corrected PF, CORPF, by dividing CORPW by DCOR.

Note, also, that in the first row of the table we have the condition that the initial position of 45.00 and a desired position of 50.00 gives us a desired correction of 5.00 percent. This is Region 2 and segment 3. The PF stored for Region 2, segment 3, is 9.99 which was described is being stored in the storage cell 53 in FIG. 2.

It is important to compare the second and fourth rows of the table. In both rows, the same region and segment are specified. However, in the fourth row, a proportional factor of 17.49 was extracted from storage. This gave an error factor ERFC of only 1.33; whereas, on the second row, an error factor of 1.76 was produced. This shows that a significant reduction in error has been obtained. Comparison of lines 4 and 6 shows that the PF for Region 2, segment 2, is now correct.

The following Table B depicts the process for corrections less than 1 percent, corresponding to Region 1. The column headed PW is pulse width outputted as well as the table entry. The column headed CORPW is the corrected PW which replaces the PW previously stored in the learning table.

added if the previous motion was in the opposite direction, or if there was no motion in response to a command for motion.

It should be noted that the addition E + H can be performed in either of two ways. A single signal equal to the sum can be outputted, in which case the computer does the summation. Or, two separate actuator signals derived from E and H can be outputted, in which case the actuator does the summation.

Figure 6:
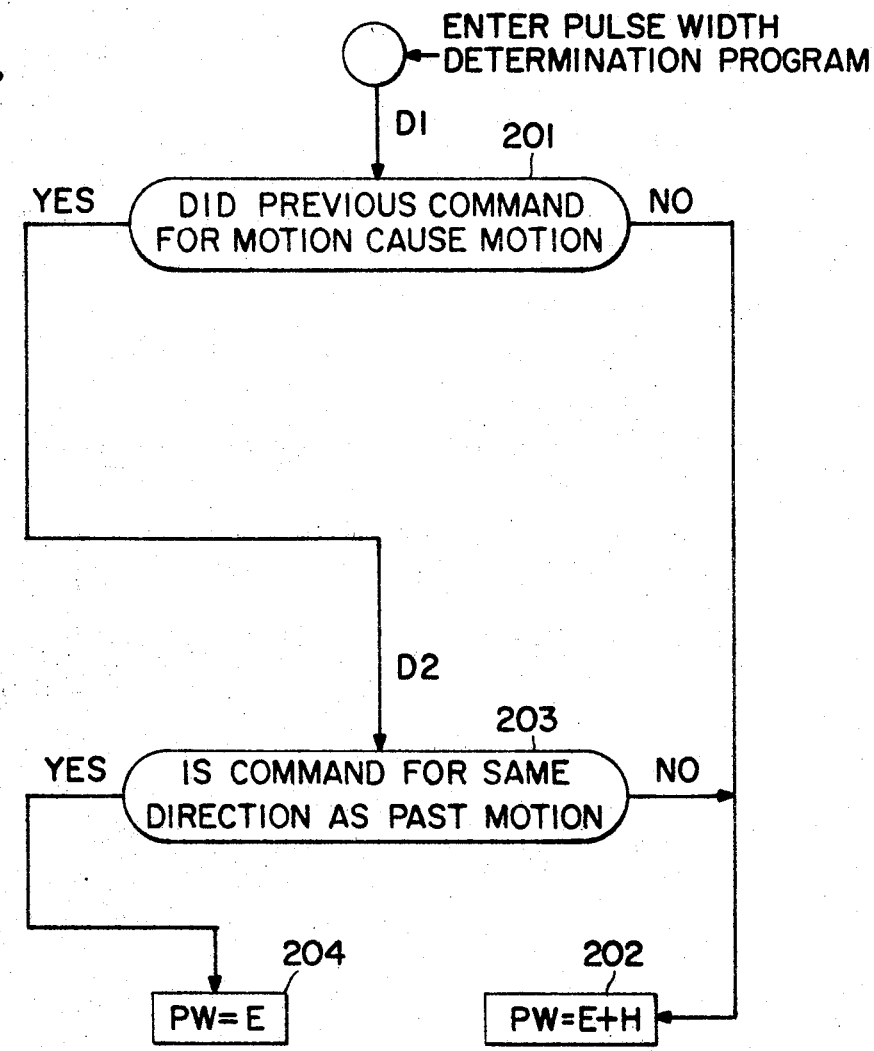
FIG. 6 is a flow sheet of pulse width determination when there is hysteresis.

As indicated in FIG. 6, the determination is made at 201 as to whether the previous command for motion caused motion. If it did not, the hysteresis value H is added to the value representing pulse width for no hysteresis. This addition is indicated at 202. If the determination at 201 indicates that the previous command for motion did cause motion, then a determination is made at 203 as to whether the command is for movement in the same direction as the previous motion. If it is, the pulse width PW is set equal to the pulse width for no hysteresis as indicated at 204. If the command is for motion in the opposite direction as the previous motion, then the pulse width is formed by adding the hysteresis value H to E as indicated at 202.

Figure 7:
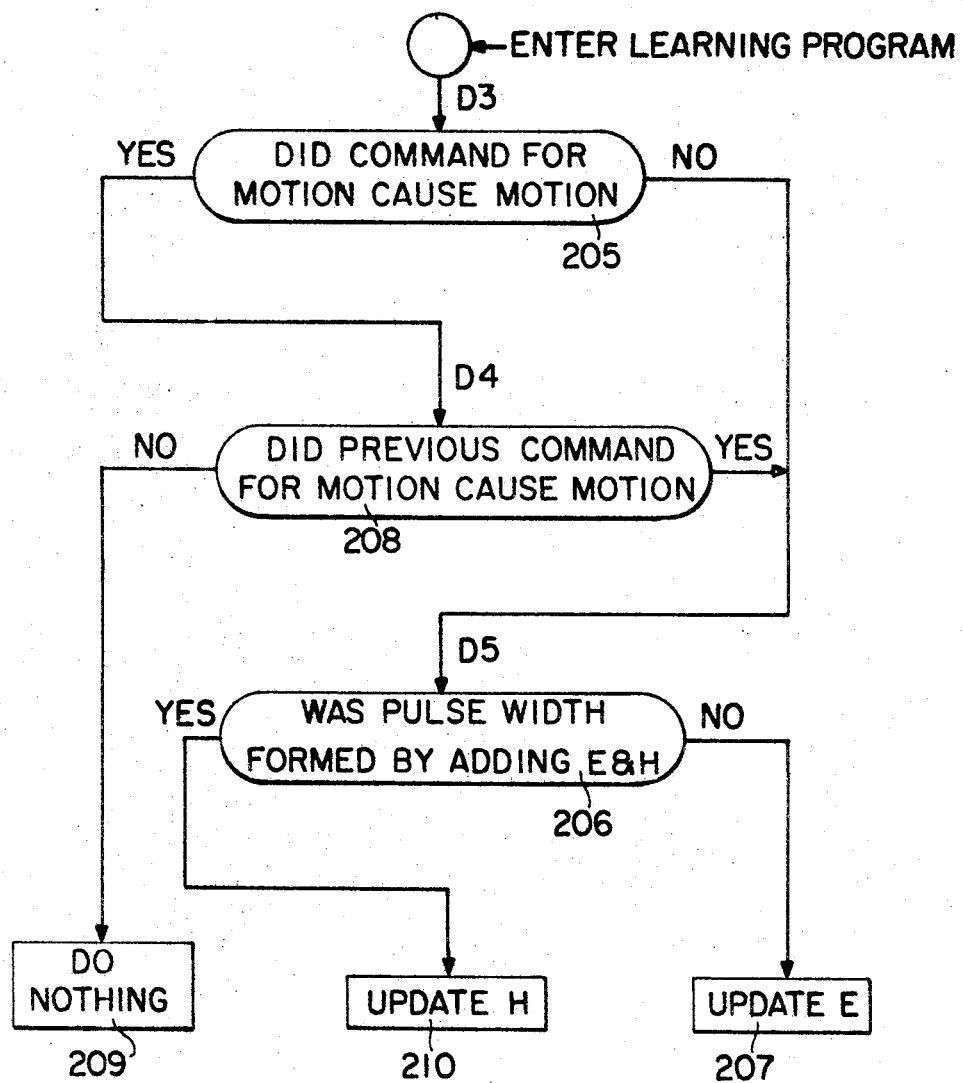
FIG. 7 is a flow sheet of the learning procedure when there is hysteresis.

The learning procedure for handling hysteresis is shown in FIG. 7. Briefly, this procedure does the following:

1. If there is no motion resulting from a command for motion, update the learning table.

TABLE B

| Run | Scan | IPOS | DPOS | RPOS | PDCOR | R | S | PF | PW | PACOR | PERR | PWCR | ERFC | CORPW | CORPF |
|---|---|---|---|---|---|---|---|---|---|---|---|---|---|---|---|
|  | 1 | 49.20 | 50.00 | 49.20 | 1.00 | 1 | 4 |  |  |  | −1.00 | 10 |  | 10 |  |
|  | 2 | 49.20 | 50.00 | 49.38 | 1.00 | 1 | 4 |  | 10 | .18 | −.82 | 8 |  | 18 |  |
|  | 3 | 49.38 | 50.00 | 49.38 | .50 | 1 | 3 |  |  |  | −.50 | 5 |  | 5 |  |
|  | 4 | 49.38 | 50.00 | 49.38 | .50 | 1 | 3 |  | 5 |  | −.50 | 5 |  | 10 |  |
|  | 5 | 49.38 | 50.00 | 49.56 | .50 | 1 | 3 |  | 10 | .18 | −.32 | 3 |  | 13 |  |
|  | 6 | 49.56 | 50.00 | 49.86 | .50 | 1 | 3 |  | 13 | .30 | −.20 | 2 |  | 15 |  |
|  | 7 | 49.86 | 50.00 | 49.86 | .10 | 1 | 1 |  |  |  | −.10 | 1 |  | 1 |  |
|  | 8 | 49.86 | 50.00 | 49.86 | .10 | 1 | 1 |  | 1 |  | −.10 | 1 |  | 2 |  |
|  | 9 | 49.86 | 50.00 | 49.86 | .10 | 1 | 1 |  | 2 |  | −.10 | 1 |  | 3 |  |
|  | 10 | 49.86 | 50.00 | 49.86 | .10 | 1 | 1 |  | 3 |  | −.10 | 1 |  | 4 |  |
|  | 11 | 49.86 | 50.00 | 49.86 | .10 | 1 | 1 |  | 4 |  | −.10 | 1 |  | 5 |  |
|  | 12 | 49.86 | 50.00 | 49.86 | .10 | 1 | 1 |  | 5 |  | −.10 | 1 |  | 6 |  |
|  | 13 | 49.86 | 50.00 | 49.91 | .10 | 1 | 1 |  | 6 | .05 | −.05 |  |  | 6 |  |
|  | 14 | 49.91 | 50.00 | 49.96 |  | .10 | 1 | 1 |  | 6 | .05 | −.05 |  |  | 6 |  |
|  |  | 49.96 | 50.00 | 49.96 |  |  | 1 | 0 |  |  |  |  |  |  |  |  |
|  |  | 49.96 | 50.50 | 50.47 | .50 | 1 | 3 |  | 15 | .51 | .01 |  |  | 15 |  |

As previously mentioned in conjunction with FIG. 2a, the output travel of the actuator in response to a particular command signal will vary depending upon the direction of the travel. Also, the characteristics may vary, depending upon whether the previous command called for motion in the same direction as the present command. Many actuators have lost motion between application of the command signal and output travel of the actuator. After this lost motion is taken up, subsequent command signals in the same direction will produce the full expected output. However, upon a change in direction, there will be backlash because of the lost motion. This is a type of hysteresis which may particularly be present in a pneumatic actuator. As used in reference to control systems, hysteresis means that the actuator characteristics are dependent upon the previous direction of motion of the actuator.

FIGS. 6 and 7 show flow diagrams of routines which learn the hysteresis and provide the proper command signal when hysteresis is present. Referring to FIG. 6, there is shown the procedure for determining the pulse width to be used. In this procedure, E represents the selected command signal in Region 1 operation or the selected command signal multiplied by DCOR in Region 2 operation. When hysteresis is present, the pulse width is formed by adding a hysteresis command signal, which is denoted H, to the value E. The hysteresis value H is 2. If there is motion, but it is incorrect, update the learning table only if there has been a previous motion in response to a command for motion.

3. The correction is made to the learning table representing the actuator characteristic without hysteresis if the pulse width had been formed without adding hysteresis. The correction is made to the hysteresis entry if hysteresis was added in forming the pulse width. As shown in FIG. 7, if the command for motion did not cause motion, as indicated by the determination at 205, and if the pulse width was not formed by adding E and H, as indicated at 206, then the value of E is updated as indicated at 207. This updating procedure is the same procedure previously described in conjunction with FIG. 4.

If the present command did cause motion, as determined at 205, and if the previous command for motion did not cause motion, as determined at 208, then no updating procedure is required as indicated at 209. However, if the present command for motion did cause motion as determined at 205, and if the previous command for motion did cause motion, as determined it 208, and if the pulse width was formed by adding E and H, as determined at 206, then the value of H is updated as indicated at 210.

The operation of the learning procedure when there is hysteresis can best be illustrated by the following table of values illustrating ten cycles of operation.

TABLE C.—LEARNING PROCESS FOR ACTUATOR WITH HYSTERESIS

| | DCOR | D1 | D2 | E | H | PW | ACOR. percent | ERR. percent | D3 | D4 | D5 | HCOR | ECOR | CORH | CORE |
|---|---|---|---|---|---|---|---|---|---|---|---|---|---|---|---|
| 1 | 1% up | N | | 0 | 0 | 0 | 0 | −1 | N | | Y | 10 | | 10 | |
| 2 | 1% up | N | | 0 | 10 | 10 | 0 | −1 | N | | Y | 10 | | 20 | |
| 3 | 1% up | N | | 0 | 20 | 20 | 0 | −1 | N | | Y | 10 | | 30 | |
| 4 | 1% up | N | | 0 | 30 | 30 | 3 | +2 | Y | N | Y | | (¹) | | |
| 5 | 1% up | Y | | 0 | 30 | 0 | 0 | −1 | N | | N | | 10 | | 10 |
| 6 | 1% up | N | | 10 | 30 | 40 | 3.5 | +2.5 | Y | N | Y | | (¹) | | |
| 7 | 1% up | Y | Y | 10 | 30 | 10 | .5 | −.5 | Y | Y | N | | 5 | | 15 |
| 8 | 1% up | Y | Y | 15 | 30 | 15 | 1 | 0 | | | | Entry is Now Correct, E=15 for 1% up | | | |
| 9 | Down | | | | | | | | Assume there is a Down Motion | | | | | | |
| 10 | 1% up | Y | N | {15, 15} | {30, 23} | 45 | 1.75 | +.75 | Y | Y | Y | −7 | | 23 | |
| | | | | | | | | | H is now almost correct | | | | | | |

¹ No Correction.

NOTE:
DCOR = Desired Correction.  
E = Learning Table Entry Without Hysteresis.  
PW = Pulse Width Outputted to Actuator.  
ACOR = Actual Correction.  
H = Learning Table Hysteresis Entry.  
ERR = Error.  
HCOR = Hysteresis Correction.  
ECOR = Correction to E.  
CORH = Corrected Hysteresis.  
CORE = Corrected E.

In the foregoing table, the values of E and H are assumed to be zero initially. The actuator characteristic is assumed to be as follows. No motion occurs until the pulse width is greater than 5 when there is no hysteresis. For each additional pulse outputted, there is 0.1 percent motion. Hysteresis is assumed to be 20.

The learning table correction process is the same as for Region 1, as described with reference to FIG. 3. The correction is equal to ERR × CS, where CS is taken to be 1 per .1 percent error.

Another illustration of the learning procedure is shown by the following table.

TABLE D.—LEARINING PROCESS AFTER HYSTERESIS IS INCREASED BY 25%

| | DCOR | D1 | D2 | E | H | PW | ACOR percent | ERR, percent | D3 | D4 | D5 | HCOR | ECOR | CORH | CORE |
|---|---|---|---|---|---|---|---|---|---|---|---|---|---|---|---|
| 1 | 1% up | Y | N | 15 | 20 | 35 | .5 | −.5 | Y | Y | Y | 5 | | 25 | |
| 2 | Down | | | | | | There is a Down Motion | | | | | Hysteresis is Now Correct | | | |
| 3 | 1% up | Y | N | 15 | 25 | 40 | 1 | | | | | Motion is Correct | | | |

In Table D, the learning tables are assumed to be initially correct. Hysteresis is changed from 20 to 25. In line 1, the motion is smaller than required due to the increase in hysteresis and the hysteresis entry is updated. Line 3 shows correct motion since the hysteresis entry is correct.

Figure 8:
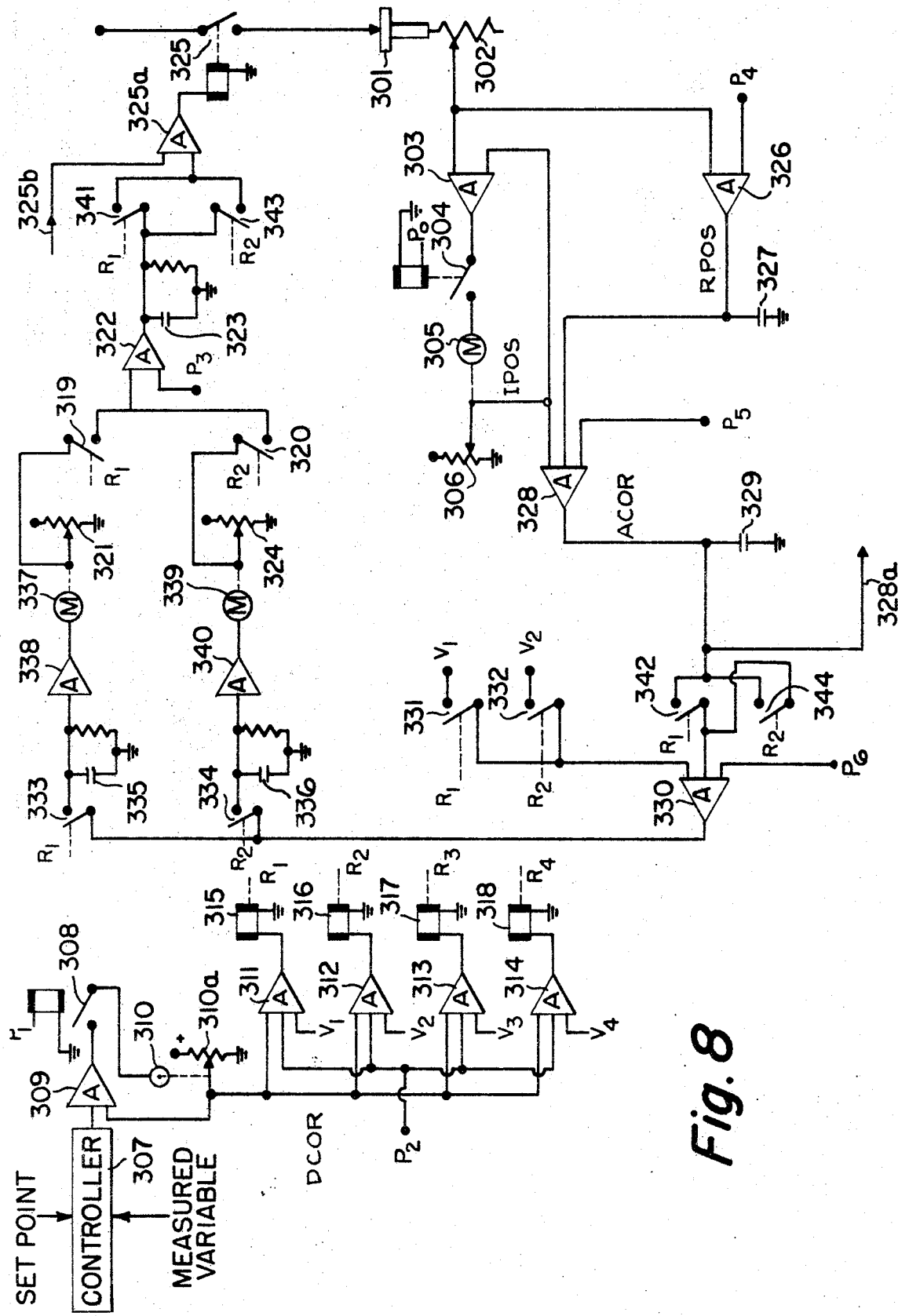
FIG. 8 is a block diagram of an analogue system.

FIGS. 8 and 9 show analogue apparatus for carrying out the invention. The timing of the analogue apparatus is controlled by a source of clock pulses shown in FIG. 8a.

Referring now to FIG. 8, there is shown the pulse width selection and updating procedure for the Region 1 condition. Position of the actuator 301 is sensed by the contact of slidewire 302. The signal indicating the position of the actuator is applied to the amplifier 303. At the clock time $P_0$, the relay contacts 304 are closed, thereby applying the position signal to the self-balancing network including motor 305 which positions the contact of a slidewire 306. The voltage on the contact is fed back to the amplifier 303 to achieve the self-balancing effect, as is conventional. The result is that after expiration of the clock pulse $P_0$, the contact of slidewire 306 has been driven to a position such that the voltage on the contact represents the position of the actuator at the beginning of the cycle.

The desired correction signal is obtained from controller 307 which compares the set point with the measured variable.

At the time $P_1$, the relay contacts 308 are closed, thereby applying the desired correction signal DCOR to the amplifier 309 which drives another self-balancing network including the motor 310 and slidewire 310a. At the end of the clock pulse $P_1$, the contact of slidewire 310a is so positioned that the voltage on the contact represents desired correction DCOR.

The desired correction signal is applied to comparison amplifiers 311—314 to be compared with the segment voltages V1, V2, V3 and V4. At the clock time $P_2$, the comparison amplifiers 311—314 are sampled so that the comparison is made at this time. The comparison amplifier associated with the segment voltage which is closest to the desired correction will actuate one of the segment relays 315—318. The segment relay which is actuated will remain actuated during the remainder of the cycle.

As shown in FIG. 8, only two segment relays 315 and 316 have been shown for the Region 1 condition, and two segment relays 317 and 318 have been shown for the Region 2 condition. It will be understood that many more segment relays will normally be used for both regions.

For the Region 1 condition, either the relay contact 319 of segment relay 315, or the contact 320 of segment relay 316 will be closed. If the relay contact 319 is closed, the voltage from the contact 319 is closed, the voltage from the contact of the slidewire 321 is applied to the amplifier 322. At clock time $P_3$, the amplifier 322 is sampled, thereby applying this segment voltage to the capacitor 323. Conversely, if the relay contact 320 had been closed, the voltage from the contact of potentiometer 324, corresponding with segment 2 voltage, would have been applied to the capacitor 323. The positions of the contacts of slidewires 321 and 324 store segment voltages corresponding with the command signals in the previous embodiments. Since they are storage elements, the voltages stored thereon can be considered to be a table of command signals.

The capacitor 323 discharges with a time constant which will control the time that the relay contacts 325 are closed to apply power to the actuator 301. That is, the pulse width is approximately proportional to the selected slidewire voltage.

At the clock time $P_0$, the voltage at the contact of slidewire 302 is applied through sampling amplifier 326 to the storage capacitor 327. The stored voltage is the resultant position signal RPOS of the drive unit.

Having the initial position and the resultant position signals, the segment voltages represented by the positions of the slidewires 321 and 324 can now be updated. At the clock time $P_5$, the actual correction signal is produced at the output of difference amplifier 328. The actual correction is the difference between the initial position and the resultant position signals, both applied to the input of amplifier 328. The actual correction signal is stored on storage capacitor 329.

At the clock time $P_6$, the error is obtained at the output of sampling amplifier 330. The error signal is the difference between the actual correction ACOR and the desired correction DCOR. The selected desired correction is applied to difference amplifier 330 through one of the relay contacts 331 or 332. One of these contacts will be closed by the selected segment relay.

The error signal from the output of difference amplifier 330 is applied through either the relay contacts 333 or 334, again depending upon which of the segment relays has been actuated. The error signal is applied either to storage capacitor 335 or 336. Assuming that contact 333 has been closed, the discharge time of the capacitor 335 determines the time duration that the stepping motor 337 is energized by the amplifier 338. This time duration will determine the movement of the contact of slidewire 321, thereby moving it by an amount proportional to the error. That is, the segment voltage, or command signal, stored by the position of the contact of the slidewire 321 has been updated. If the segment 2 relay 316 is actuated, then the motor 339 is actuated through amplifier 340 for a time duration which would update the position of the contact of slidewire 324 by the appropriate amount.

It should be noted that if the desired correction falls within Region 1, one of the relays 315 or 316 will be actuated. Contacts 341 and 342 will be closed or contacts 343 and 344 will be closed, thereby enabling the Region 1 circuitry of FIG. 8. Contacts 341 and 342 are closed when relay 315 is actuated. Contacts 343 and 344 are closed when relay 316 is actuated.

If the magnitude of the desired correction falls within Region 2, one of the segment relays 317 or 318 will be actuated. The contacts of these relays are shown in FIG. 9. In FIG. 9, only the additional circuitry, including relay contacts required for Region 2 operation, is shown. The lines 325b and 328a connect the circuitry of FIGS. 8 and 9.

In Region 2 operation, the selected PF, which is the command signal for Region 2, is applied through either contact 360 or 361 to the multiplier 362. The selected PF is multiplied by the desired correction in the multiplier 362. At pulse time $P_3$, the product is passed through sampling amplifier 363 to the storage capacitor 364. The discharge time of the capacitor 364 determines the time that amplifier 325a will close the relay 325 to apply power to the actuator 301. Relay contacts 365 and 366 are included in parallel to act as a region selector. If either of the relays 317 or 318 are actuated, indicating a Region 2 condition, the time that power is applied to actuator 310 will be determined by the discharge time of capacitor 364.

The updating procedure for Region 2 is as follows. If the desired correction is in Region 2, one of the relay contacts 345 or 346 will be closed. In this case, the actual correction is applied to the divider 347 which produces at the output the quotient of desired correction to actual correction. This quotient is multiplied by the proportional factor PF which is the command signal in Region 2. The multiplication is carried out in the multiplier circuit 348. As one example of a multiplier divider suitable for use, reference is made to U.S. Pat. No. 3,165,650 to White.

The output of multiplier 348 is the corrected proportional factor. In order to determine the correction to be applied to the proportional factor for updating, the difference between corrected proportional factor and the old PF is obtained in the difference amplifier 349 which is sampled at the clock time $P_6$. The correction for proportional factor is applied through either the contact 350 or 351 depending upon which of the segment relays has been actuated. If the relay contact 350 is closed, the capacitor 352 will be charged to a voltage representing the correction for the proportional factor. The discharge time of this capacitor through its corresponding resistor will determine the time that power is applied through amplifier 353 to the stepping motor 354. This will correct the position of the contact on the slidewire 355, thereby updating the stored value of PF for this segment. Similarly, if the relay contact 351 has been closed, capacitor 356 would have been charged. The discharge time of this capacitor will determine the time that amplifier 357 applies power to the stepping motor 358 which corrects the position of potentiometer 359. The position of the contact of potentiometer 359 is the stored value of PF for this segment.

Relay contacts 360 or 361 connect the old value of PF to the multiplier 348 for updating.

Referring to FIG. 8a, there is shown a chart showing the relative time durations of the clock pulses for one cycle. It will be noted that the clock pulse $P_0$ is relatively long. This is required to allow time for the self-balancing systems, including motor 305, to reach their desired positions. Similarly, the clock time $P_1$ is relatively long to allow the self-balancing network, which includes motor 310, to reach its desired position. There is a relatively long period between clock pulses $p_3$ and $P_4$. This allows time for the actuator 301 to respond to the actuator signal which is applied to it. Similarly, a long time period exists between the $P_6$ clock time and the beginning of the next cycle in order to allow the contacts of slidewires 321, 324, 355, or 359 to come to rest as the proper position.

As one modification of the system of FIGS. 8 and 9 the storage elements, shown as motor driven potentiometers, could be digital storage elements such as a magnetic core memory. In this case converters for converting between analogue and digital form must be provided on the input and output of the storage elements. Digital storage elements provide advantages of greater accuracy, reliability, speed of operation, and lower cost.

While particular embodiments of the invention have been shown and described, modifications may be made without departing from the true spirit and scope of the invention. The appended claims are, therefore, intended to cover all such modifications.

I claim:

1. A control system for controlling a controlled variable to produce an actuator signal for controlling an actuator, said system operating in a plurality of control cycles, said system being responsive to a desired correction signal, said desired correction signal being derived from the actual controlled variable and the desired value of the controlled variable, said controlled variable of said system being responsive to said actuator, said system comprising:
    storage means for storing a command signal, and a desired correction signal;
    means for deriving an actuator signal from said stored command signal;
    an actuator, said actuator signal being applied to said actuator;
    means for generating an actual correction signal representative of the actual change in the value of said controlled variable subsequent to the application of said actuator signal to said actuator;
    means for generating an error signal which is a function of said desired correction signal and said actual correction signal in each cycle; and
    means for modifying said command signal in accordance with said error signal for reducing said error signal in a subsequent control cycle, whereby the modified command signal approaches a value such that the actuator signal derived from the command signal in a subsequent cycle produces an actual change in controlled variable that approaches the desired correction.

2. The system recited in claim 1 further including:
    means responsive to said desired correction signal for changing the operation of said means for modifying said command signal in accordance with the magnitude of said desired correction signal.

3. The system recited in claim 1 wherein said storage means stores a plurality of command signals, said system further comprising:
    selection means responsive to said desired correction signal for selecting a command signal representative of a particular segment of an actuator characteristic, said actuator characteristic relating the desired correction and the actuator signal.

4. The system recited in claim 1 wherein a first group of command signals represents values which will produce the desired correction when said desired correction signal is below a predetermined value, and wherein a second group of said command signals represents values which, when multiplied by said desired correction signal, will produce the desired correction when said desired correction signal is above said predetermined value, said system further including:
- a comparator for comparing said desired correction signal to said predetermined value to determine the group from which the command signal was selected;
- selection means responsive to said comparator for selecting one of said first group of command signals when said desired correction signal is below said predetermined value, said selection means being responsive to said comparator for selecting one of said second group of command signals when said desired correction signal is above said predetermined value; and
- means for multiplying said desired correction signal by a selected one of said second group of said command signals, the output of said means for multiplying being applied to said means for deriving said actuator signal, the selected command signal of said first group of command signals being applied to said deriving means.

5. The system recited in claim 4 wherein said means for modifying said command signal further includes:
- divider means, said desired correction signal and said actual correction signal being applied to said divider means to produce an error factor signal representing the quotient of desired correction to actual correction;
- a multiplier, said error factor signal being applied to said multiplier; and
- means responsive to said comparator for applying a selected one of said second group of command signals to said multiplier when said desired correction signal is above said predetermined value to produce said modified command signal.

6. The system recited in claim 5 further including:
- a comparator for comparing said actual correction signal to said predetermined value;
- a difference circuit, said actual correction signal and said desired correction signal being applied to said difference circuit to produce an error signal at the output thereof;
- a multiplier, said error signal being applied to said multiplier and a signal representing a constant being applied to said multiplier to produce a command correction signal at the output thereof; and
- means responsive to the comparison of said desired correction signal and said actual correction signal to said predetermined value to modify the selected command signal from said second group of command signals by a function of said command correction signal when said desired correction signal is above said predetermined value but said actual correction signal is less than said predetermined value.

7. The system recited in claim 4 wherein said means for modifying said command signal further includes:
- a difference circuit, said actual correction signal and said desired correction signal being applied to said difference circuit to produce an error signal at the output thereof;
- a multiplier, said error signal being applied to said multiplier and a signal representing a constant being applied to said multiplier to produce a command correction signal at the output thereof;
- An adder, said command correction signal being applied to said adder; and
- means responsive to said comparator for applying one of said first group of command signals to said adder when said desired correction signal is below said predetermined value.

8. The system recited in claim 1 wherein a set point signal representing the set point of said controlled variable is applied to the input of said system, said system further comprising:
- means responsive to said set point signal and to a signal representing said controlled variable for producing a difference signal representing the difference between said set point and said controlled variable; and
- a controller, said difference signal being applied to said controller, said controller producing said desired correction signal.

9. The system recited in claim 1 further including:
- a valve, said actuator controlling said valve; and
- means sensing the position of said valve for producing a signal representing said controlled variable.

10. The system recited in claim 1 wherein said desired correction signal, actual correction signal, error signal and command signal are analogue signals and wherein said means for generating comprise analogue computing devices.

11. A direct digital computer control system operating in a plurality of control cycles for controlling an actuator for a control element having output characteristics which vary as a function of actuator signal and which vary with environmental conditions, including:
- means for generating during each cycle a signal representing the actual position of said actuator;
- means for generating the desired correction for said actuator for each cycle;
- means for storing a plurality of command signals from which actuator signals are derived to produce a given output from a particular segment of said characteristics;
- means responsive to said desired correction outputs for selecting a command signal corresponding with the desired correction;
- means for deriving an actuator signal from the selected command signal;
- means for moving the control element in response to an actuator signal derived from the selected command signal; the improvement comprising:
    - means for producing an error signal in each control cycle in response to the desired position of the control element and the final position of the control element; and
    - means for modifying the selected command signal in accordance with said error signal.

12. The method of operating a computer in a control system for controlling a controlled variable to produce an actuator signal for controlling an actuator, said system operating in a plurality of control cycles, said system being responsive to a desired correction signal, said controlled variable of said system being responsive to said actuator, said method comprising:
- storing a desired correction signal;
- storing a command signal;
- deriving from said stored command signal an actuator signal;
- applying said actuator signal to said actuator;
- positioning said actuator in response to said actuator signal;
- generating an actual correction signal representative of the actual change in value of said controlled variable subsequent to the application of said actuator signal to said actuator;
- generating an error signal which is a function of said desired correction signal and said actual correction signal in each cycle; and
- modifying said command signal in accordance with said error signal for reducing said error signal in a subsequent control cycle, whereby the modified command signal approaches a value such that the actuator signal derived from the command signal in a subsequent cycle produces an actual change in controlled variable that approaches the desired correction.

13. The method recited in claim 12 wherein said actuator has hysteresis characteristics such that the response of said actuator to a particular actuator signal will vary depending upon the direction of the previous motion, and wherein there is a stored hysteresis command signal, said method further comprising:
- producing an output when the actuator signal calls for motion of said actuator in a direction different from that caused in the previous cycle; and
- responsive to said last-named output, adding said hysteresis command signal to said stored command signal.

14. The system recited in claim 13, further comprising:

producing an output when the actuator signal in the previous cycle does not cause motion of said actuator; and
responsive to said last-named output, adding said hysteresis command signal to the stored command signal.

15. The method recited in claim 12 wherein said actuator has hysteresis characteristics such that the response of said actuator to a particular actuator signal will vary depending upon the direction of the previous motion, and wherein a hysteresis command signal is stored, said method further comprising:
producing an output when the actuator signal calls for motion of said actuator in a direction.

16. The method recited in claim 12 further comprising:
responsive to said desired correction signal, changing the modification of said command signal in accordance with the magnitude of said desired correction signal.

17. The method recited in claim 12 wherein a plurality of command signals are stored, said method further comprising:
responsive to said desired correction signal, selecting a command signal representative of a particular segment of an actuator characteristic, said actuator characteristic relating the desired correction and the actuator signal.

UNITED STATES PATENT OFFICE
CERTIFICATE OF CORRECTION

Patent No. 3,555,252  Dated January 12, 1971

Inventor(s) Murray Garden

It is certified that error appears in the above-identified patent and that said Letters Patent are hereby corrected as shown below:

Col. 1, line 48, the period has been omitted after the word "actuator".

Col. 2, line 47, "resister-" should be --register--.

Col. 2, line 61, there should be a comma after the word "gain".

Col. 3, line 64, after "correction" and before the peri there should be inserted --and the actual correction--.

Col. 4, line 37, cancel "for" per amendment of 2-12-70.

Col. 4, line 74, a comma should be inserted after "sign first occurrence.

Col. 5, line 25, "ECOR" should be --DCOR--.

Col. 5, line 54, "greater" should be --less--.

Column 5, lines 55 and 56, should be cancelled and the following inserted instead therefor -- cent, the routine wh: is denoted Region 1 is to be followed. If the value of the desired DCOR is greater than 1 percent, the routine which h; been denoted Region 2 is to be followed. The routines or procedures which have been designated Region 1 and Region 2, and which have been indicated --.

3,555,252                                                             PAGE - 2

Col. 5, line 57, after "have been" insert --designa Region 1 and Region 2 and which have been--.

Col. 6, line 69, cancel "cell" first occurrence.

Col. 7, line 23, after "against" insert --a full lc The curve 44 shows the output travel as a function of the inp signal when the actuator is working against--.

Col. 7, line 70, "percent to 1.0 of" should be --pe to 1.0 percent of--.

Col. 8, line 43, "exist" should be --exists--.

Col. 8, line 47, after "4.0 percent" insert -- , ir range 4.0 percent--.

Col. 9, line 60, after "actual correction" insert --and desired correction--.

Col. 9, line 69, after "PWCOR" insert --to the puls width PW as indicated at 107. The pulse width correction PWC Col. 10, line 23, "is" should be --in--.

Col. 10, line 27, after "would be" insert --quite large, and in updating the PF by multiplying it by ERFC, ther would be--.

Col. 11, line 38, "NEED" should be --USED--.

Col. 11, line 60, after "DPOS-IPOS" there should be inserted --$\leq$--.

Col. 11, line 64, after "is" there should be inserted --$\leq$--.

Col. 11, line 73, after "DPOS-IPOS" there should be inserted --$\leq$--.

Col. 14, line 55, "and" should be underscored.

Col. 14, line 56, "not" should be underscored.

Col. 14, line 61, "and" should be underscored.

Col. 14, line 64, "and" should be underscored.

Col. 14, line 66, "it" should read --at--; same line "and" should be underscored.

3,555,252

Col. 16, line 45, after "from the contact" (first occurrence) the following words should be deleted, "318 is closed, the voltage from the contact".

Col. 16, line 61, "time $P_o$" should read --time $P_4$--

Col. 17, line 43, "310 will be" should read --301 will be--.

Col. 17, line 52, at end of line "multiplier di-" should read --multiplier-di- --.

Col. 17, line 70, "contact 351 has" should read --contact 351 had--.

Col. 18, line 10, "pulses $p_3$ and" should read --pulses $P_3$ and--.

Col. 18, line 15, "rest as" should read --rest at--

Col. 19, line 63, "An adder," should read --At adder

Col. 21, line 11, after "direction" cancel the period and the following words should be added:

--different from that caused in the previous cycle, and responsive to the last-named output, supplying said hysteresis command signal as an additional input during the modification of said command signal.--

Signed and sealed this 14th day of March 1972.

(SEAL)
Attest:

EDWARD M. FLETCHER, JR.
Attesting Officer

ROBERT GOTTSCHALK
Commissioner of Patents